US007960630B2

(12) United States Patent
Steinberger

(10) Patent No.: US 7,960,630 B2
(45) Date of Patent: Jun. 14, 2011

(54) TREMOLO MECHANISM FOR A STRINGED MUSICAL INSTRUMENT WITH ANGLED SADDLE ROLLERS

(75) Inventor: Ned Steinberger, Nobleboro, ME (US)

(73) Assignee: Gibson Guitar Corp., Nashville, TN (US)

( * ) Notice: Subject to any disclaimer, the term of this patent is extended or adjusted under 35 U.S.C. 154(b) by 0 days.

(21) Appl. No.: 11/776,767

(22) Filed: Jul. 12, 2007

(65) Prior Publication Data

US 2008/0229899 A1 Sep. 25, 2008

Related U.S. Application Data

(60) Provisional application No. 60/896,523, filed on Mar. 23, 2007.

(51) Int. Cl.
*G01D 3/00* (2006.01)

(52) U.S. Cl. .......... 84/313; 84/307

(58) Field of Classification Search .......... 84/313, 84/307

See application file for complete search history.

(56) References Cited

U.S. PATENT DOCUMENTS

| | | | | |
|---|---|---|---|---|
| 383,275 | A | 5/1888 | Bowers | |
| 2,905,042 | A * | 9/1959 | Hoyer | 84/307 |
| 2,972,923 | A | 2/1961 | Fender | 84/313 |
| 3,326,072 | A | 6/1967 | Price | 84/313 |
| 3,411,394 | A | 11/1968 | Jones | 84/313 |
| 4,079,652 | A | 3/1978 | Gittler | 84/1.16 |
| 4,141,271 | A | 2/1979 | Mullen | 84/312 P |
| 4,170,161 | A | 10/1979 | Kaftan | 84/312 R |
| 4,457,201 | A | 7/1984 | Storey | 84/313 |
| 4,475,432 | A | 10/1984 | Stroh | 84/314 N |
| 4,608,904 | A | 9/1986 | Steinberger | 84/304 |
| 4,625,613 | A | 12/1986 | Steinberger | 84/298 |
| 4,632,004 | A | 12/1986 | Steinberger | 84/313 |
| 4,632,005 | A | 12/1986 | Steinberger | 84/313 |
| 4,638,711 | A | 1/1987 | Stroh | 84/313 |
| 4,656,915 | A | 4/1987 | Osuga | |
| 4,704,936 | A | 11/1987 | Steinberger | 84/313 |
| 4,892,025 | A | 1/1990 | Steinberger | 84/313 |
| 5,140,884 | A | 8/1992 | Bowden | 84/312 R |
| 5,429,028 | A * | 7/1995 | Fisher, IV | 84/313 |
| 5,824,925 | A | 10/1998 | Yost | 84/313 |
| 6,100,459 | A | 8/2000 | Yost | 84/313 |
| 7,071,398 | B2 | 7/2006 | Hannes | |

OTHER PUBLICATIONS

International Search Report and Written Opinion of the International Searching Authority (US) for International Application No. PCT/US2008/53553 dated Jun. 27, 2008.

* cited by examiner

*Primary Examiner* — Jianchun Qin

(74) *Attorney, Agent, or Firm* — Bates & Bates, LLC; Andrea E. Bates; Kathryn Cox

(57) ABSTRACT

A tremolo mechanism having a novel roller mounted beneath a tensioned string of a stringed musical instrument is described. During oscillatory movement, the tensioned string exerts both a static and a vibratory force on the roller. The roller rotates in relation to the tensioned string such that the static force is generally greater than any component of the vibratory force. The novel roller may be a saddle roller with a saddle block having two opposing block walls which form a roller cavity. The block walls each have a roller bore aligned along a roller axis. The saddle roller includes a cylindrical body attached to a roller pin and a circumferential seat receiving a tension string. The roller pin is rotatably disposed such that the saddle roller is in the saddle block cavity. The roller axis extends obliquely to define an oblique roller angle.

13 Claims, 16 Drawing Sheets

TREMOLO MECHANISM FOR A STRINGED MUSICAL INSTRUMENT WITH ANGLED SADDLE ROLLERS

PRIORITY CLAIM

The present application specifically claims priority to U.S. Provisional Patent Application Ser. No. 60/896,523 filed Mar. 23, 2007. The entirety of this priority document is hereby specifically incorporated by reference.

BACKGROUND OF THE INVENTION

The present invention relates generally to mechanisms for tuning or detuning a stringed musical instrument. Specifically, the invention relates to a mechanism for changing the pitch to create vibrato effects and other pitch variations in a stringed musical instrument. The invention also relates to a mechanism for reducing transmission of vibration noise between bridge and other components of tuning devices for stringed musical instruments.

A tremolo mechanism functions by changing the tension of all of the strings of an instrument simultaneously to create a pitch change during playing of the instrument to create a vibrato sound. As used with electric guitars, a tremolo mechanism typically incorporates a tailpiece pivotally joined to a base support mounted on the body of the guitar. A tuning assembly attached to the frame of the tailpiece is utilized to anchor the end of each of a plurality of tensioned strings strung over the guitar's bridge. In such a mechanism, a counter spring is utilized to counteract the reactive bias of the plurality of tensioned strings upon the tailpiece. A tremolo arm is connected to the tailpiece for pivoting of the tailpiece about the base while simultaneously playing the instrument.

A significant problem with such tremolo mechanisms regards to the pitch relationship between the individual strings. In earlier devices, all strings of the instrument are moved the same distance when the mechanism is actuated. Since the higher pitched strings of the instrument generally have much greater elasticity than the lower strings, the lower pitched strings exhibit a greater change in pitch for a given change in string length. For example, if a chord is played on the instrument, and the tremolo mechanism is actuated, the length of each string changes an equal amount. The low pitched strings of the instrument detune (i.e. change pitch) more than the high pitched strings, and the pitch relationships within the chord are lost.

The insufficiency of conventional tremolo mechanisms in maintaining pitch relationships as the tailpiece is pivoted during instrument play has been recognized by inventors in the prior art. An example of a tremolo mechanism adapted to maintain pitch relationships is shown in one of the present inventor's prior patents, U.S. Pat. No. 4,632,005 (the '005 patent) issued to Steinberger on Dec. 30, 1985, entitled "Tremolo Mechanism for an Electric Guitar." The '005 patent teaches use of a roller bridge disposed atop a base mounted on the body of a guitar. The roller bridge includes a plurality of saddle rollers assembled on a support surface of the base. A plurality of anchor devices are slidably mounted on a plate providing a second support surface mounted on the tailpiece frame. The anchor devices are each aligned parallel with the axis of the tensioned string strung across a corresponding saddle roller and anchor the end of the tensioned string. The anchor device includes a slotted cylindrical bore adapted to hold a disc shaped ball affixed to the end of the tensioned string. Each anchor device is connected to a spring-biased threaded rod, which may be operated to position the anchor device longitudinally so as to adjust the pitch of such string.

The '005 patent teaches joining the tailpiece to the base by means of a detuning pivot having a pivot axis which is oblique with respect to the string plane defined generally by the plurality of strings. Thus, for a selected radial displacement of the tailpiece about the pivot axis, the string ends of the individual strings are moved varying distances with respect to the corresponding bridge roller so as to generally preserve the pitch relationships between the strings as the tremolo device is employed.

Although a significant step in the art of preserving pitch relationships as the tremolo mechanism is used during guitar play, the device of the '005 patent has room for improvement. One issue encountered in using the mechanism is the tendency of the string end anchors to malfunction. Movement of the tailpiece causes changes in both the magnitude and direction of tension force exerted on the string end ball disposed in the slotted cylindrical bore of the anchor mechanism. Friction may cause the disc shaped balls to jam or cock in the anchor bore. Such jammed balls change the designed geometry of the bridge break angle and change the designed distance between the anchor point and the portion of string held in the bridge roller (herein termed "string apex"). Jammed balls may also become displaced from the bore or may suddenly slip from a jammed position to an aligned position during play. All of these malfunctions affect the amount of change in string length between the anchor mechanism and the bridge, and thus affect the pitch of the string.

Accordingly, what is needed is an apparatus that provides for the alignment of the anchor, string end and the string apex. Such alignment apparatus should react continuously, rapidly and without detectable frictional effects as the tremolo mechanism is displaced through its designed range of rotational freedom relative to the detuning axis.

An additional problem common to roller bridge mechanisms such as the tremolo mechanism of the '005 patent is vibration noise transferred from an oscillating string to the roller mechanism and therefrom to adjacent roller mechanisms and strings. When a guitar string is plucked and released, the string vibrates in multiple directions in the transverse plane. A string vibrating within the roller seat causes the roller to vibrate as well. Since the roller is connected to the saddle block via a roller pin press-fitted through the roller, components of string vibration that are parallel to the roller pin cause the roller and roller pin to vibrate axially within the bores of the saddle block wall. Vibrations within the saddle block wall are transmitted to adjacent saddle block walls and to other bridge components. This vibrational "cross-over" noise is detrimental to the acoustic characteristics of the instrument. Thus, it is highly desirous that a means of eliminating such "cross-over" noise be incorporated into tremolo mechanisms as well as in general roller bridge mechanisms.

Accordingly, what is needed is an apparatus that prevents axial vibration of such roller and roller pins within the bores of saddle blocks of saddle rollers. Such apparatus should minimize the frictional effects of noise suppression and not interfere with the roller function in supporting the tensioned string.

A third disadvantage of the tremolo apparatus of the '005 patent is its limited combination of locking positions and the inability of it and other prior art tremolo mechanisms to provide a plurality of locked positions separated tonally by only the smallest chromatic intervals. The '005 patent teaches that the lock is positioned about the longitudinal midpoint and on one side of the tailpiece frame. The lock is operated by means of the handle for positioning a locking bar in one of three (3) locking seats that are disposed on an extending rod and in opposition to the locking ridge. The lock has only one locking position wherein the lock prevents displacement of the tailpiece frame from the seat in either direction of rotation about the detuning axis (herein termed a "positive control" locking position). This is accomplished in the '005 patent apparatus by placing walls or stops on either side of the central seat of the locking mechanism so as to create a channel to receive and hold the locking bar. The lock has two additional locking positions, one on either side of the central locking channel. The additional locking positions have only one stop that is disposed between the locking position seat and the central seat. Displacement in the opposite direction of rotation is prevented by the counter bias of the counter spring holding the locking ridge against the stop.

The method of tuning the stringed instrument of the '005 patent requires that the tremolo mechanism be first locked in the central locking seat. The individual strings are then tuned and the tremolo mechanism is unlocked. Tune is restored by adjustment of the counter spring. The result is that the tailpiece frame in its equilibrium position is necessarily generally aligned with the radial position of the tailpiece frame corresponding to that when the lock is locked in the central channel. The tremolo device of the '005 patent can adjust pitch up or down only one full chromatic step by engaging the lock in the corresponding additional locking positions.

Additionally, the lock of the '005 patent is very sensitive to any deviation from an intermeshing alignment of the component parts of the lock as the lock is placed in a locking position. Because the locking components are rigidly connected, an exact intermeshing of the component parts is necessary for the lock to function properly. While continuing to play the instrument, the user must properly first operate the handle as a lever to deflect the tailpiece to very closely align the locking components and then rotate the handle to engage the locking components. Not surprisingly, misalignments are common and may prevent the lock from locking or may damage a lock component.

Accordingly, what is needed is a tremolo lock mechanism that provides for tuning of the instrument such that the tailpiece frame may be aligned in any of a plurality of equilibrium positions, each corresponding to one of a plurality of positive control locking channels. Such a tremolo device should be capable of adjusting the pitch of the strings by any of a plurality of half chromatic steps by engaging the lock in corresponding locking positions.

Additionally, what is needed is a tremolo lock mechanism that accommodates misalignment of intermeshing component parts during the process of locking while neither failing to lock nor damaging a lock component.

Additional objects and advantages of the invention will be set forth in part in the description which follows, and in part will be obvious from the description or will be learned by practice of the invention.

BRIEF SUMMARY OF THE INVENTION

In one embodiment of the present invention a novel and advantageous roller is mounted beneath a tensioned string of a stringed musical instrument such as a guitar. The tensioned string exerts a static force on the roller and further exerts a vibratory force on the roller during oscillatory movement of such string. The roller rotates around a roller axis disposed with relation to the tensioned string such that the component of the static force directed along the roller axis is generally greater than any component of the vibratory force directed along the roller axis.

In a preferred embodiment of the present invention, a tremolo mechanism having a plurality of novel saddle rollers is mounted to the body of a stringed instrument having a plurality of tensioned strings extending over the body. The tremolo mechanism includes a base having a support surface. A bridge, including a plurality of saddle assemblies, is disposed on the support surface beneath the tensioned strings. Each saddle roller assembly includes a saddle block having two opposing block walls which form a roller cavity there between. The block walls each have a roller bore disposed in alignment along a roller axis. The saddle roller includes a cylindrical body attached to a roller pin. The saddle roller further includes a circumferential seat receiving a tension string. The roller pin is rotatably disposed in the roller bores such that the saddle roller is disposed in the saddle block cavity.

The roller axis is oriented so as to extend obliquely with respect to the support surface so as to define an oblique roller angle. The tensioned string exerts a static force on the roller and further exerts a vibratory force on the roller during oscillatory movement of the string. The forces exerted on the roller are transmitted through the roller pin to the support walls. Such forces are resolved into roller axis components exerted along the axis of the roller pin and normal components exerted perpendicular to the axis roller pin. The roller angle is such that the component of the static force directed along the roller axis is generally greater than the component of the vibratory force directed along the roller axis. Advantageously, this relationship prevents vibration of the roller and roller pin along the roller axis.

The roller angle of preferred embodiments of the present invention includes oblique interior angles between about three degrees (3°) to about thirty degrees (30°) with respect to the support plane. A roller angle of about six degrees (6°) has been determined to be the more preferred roller angle for prototypes of the saddle roller assemblies of the preferred embodiments. At this more preferred roller angle, the roller pin remains seated in the lower of the roller bores during vibration of the string caused by playing of the instrument. Advantageously, the roller axis component of the static force created by a six degree (6°) roller angle does not significantly increase the amount of rotational friction generated by the roller pin rotating with respect to the roller bores. This novel feature of the tremolo mechanism of this invention is a significant improvement over the prior art roller systems.

BRIEF DESCRIPTION OF THE SEVERAL VIEWS OF THE DRAWINGS

The accompanying drawings which are incorporated herein and constitute a part of this specification illustrate at least one preferred embodiment of the invention and, together with the description, serve to explain the principles of the invention.

FIGS. **5*a* and 5*b*** are views of a second preferred embodiment of the tremolo mechanism of the present invention along a longitudinal cross section.

Figure 1:
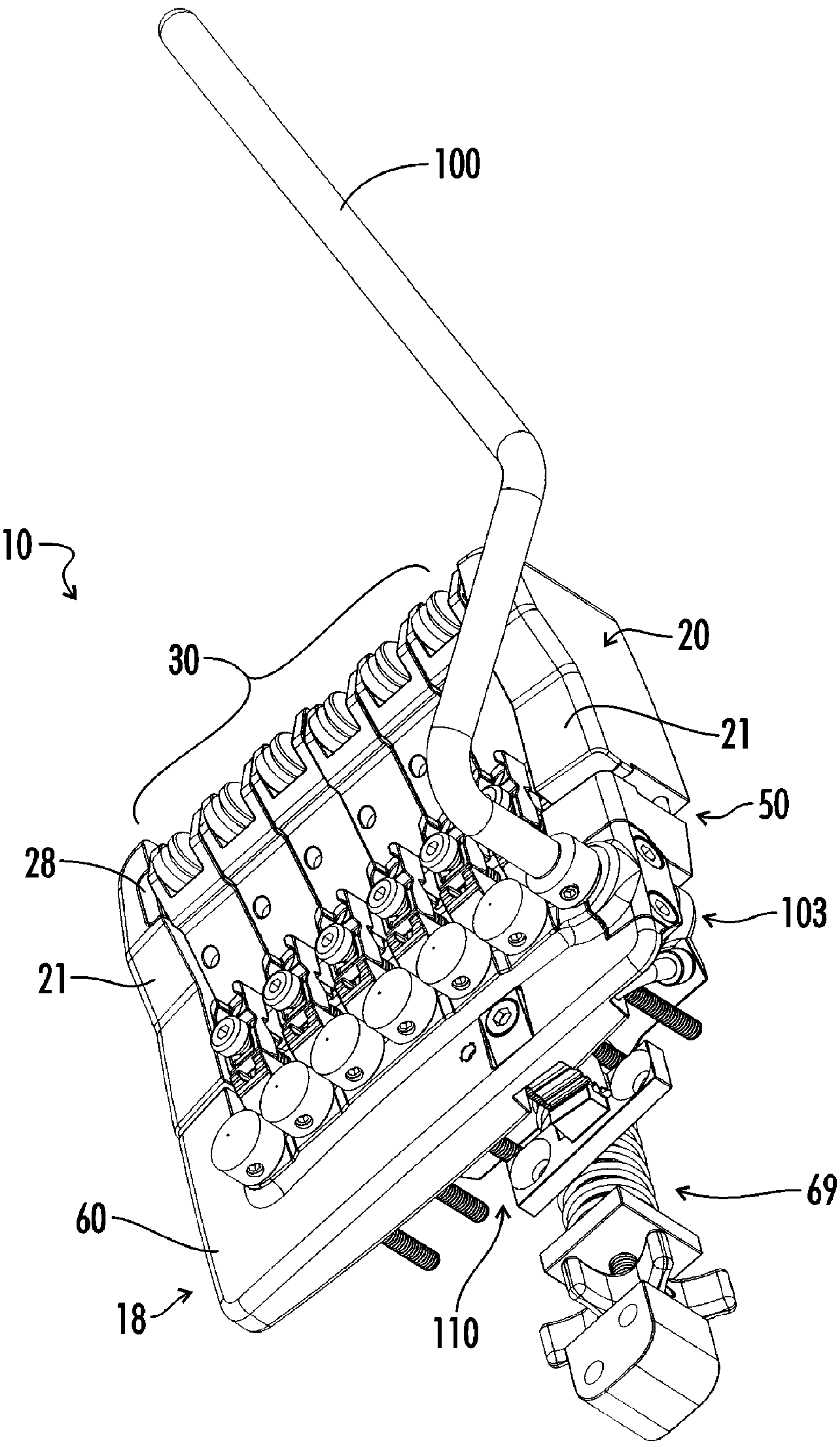
FIG. 1 is an oblique perspective view of one preferred embodiment of the tremolo mechanism of the present invention.
Figure 2:
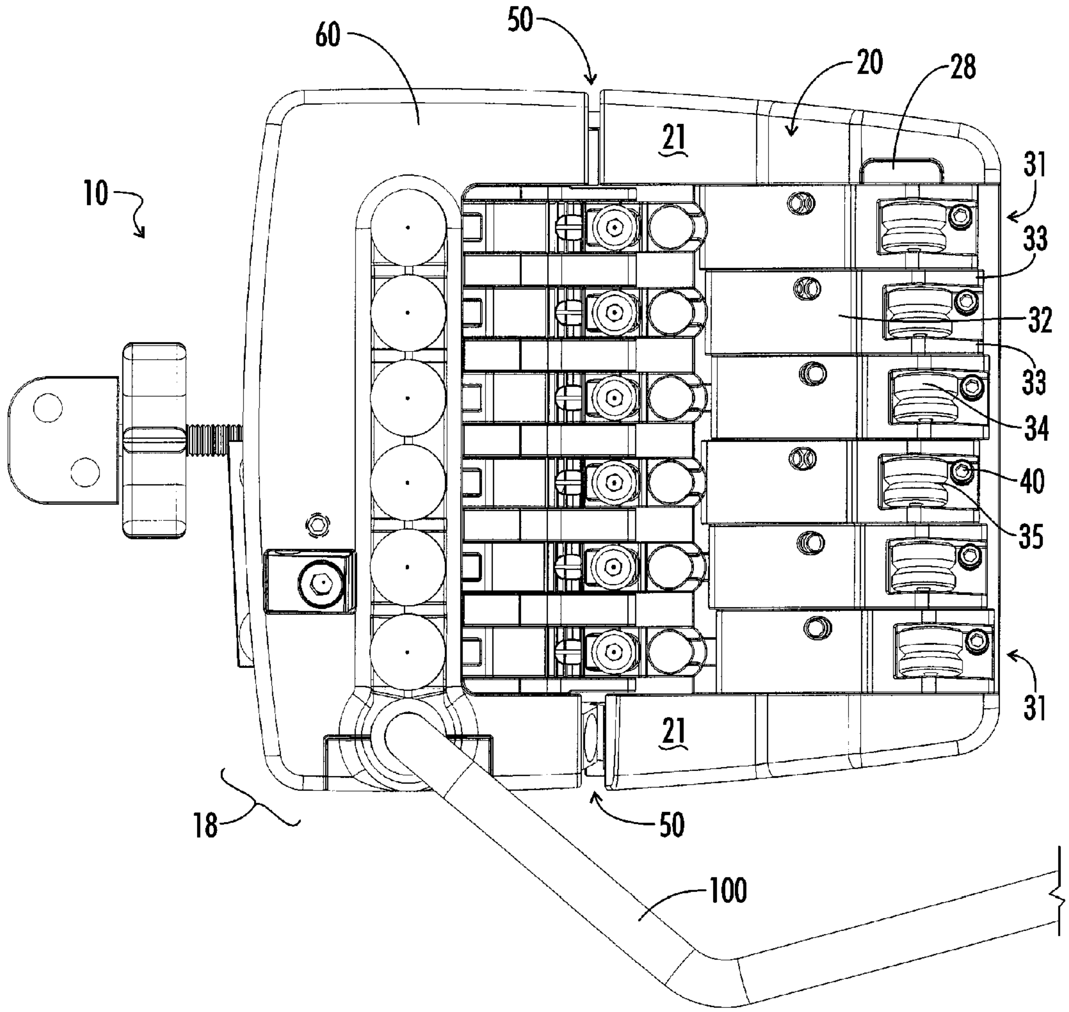
FIG. 2 is an overhead view of the apparatus of FIG. 1.
Figure 6:
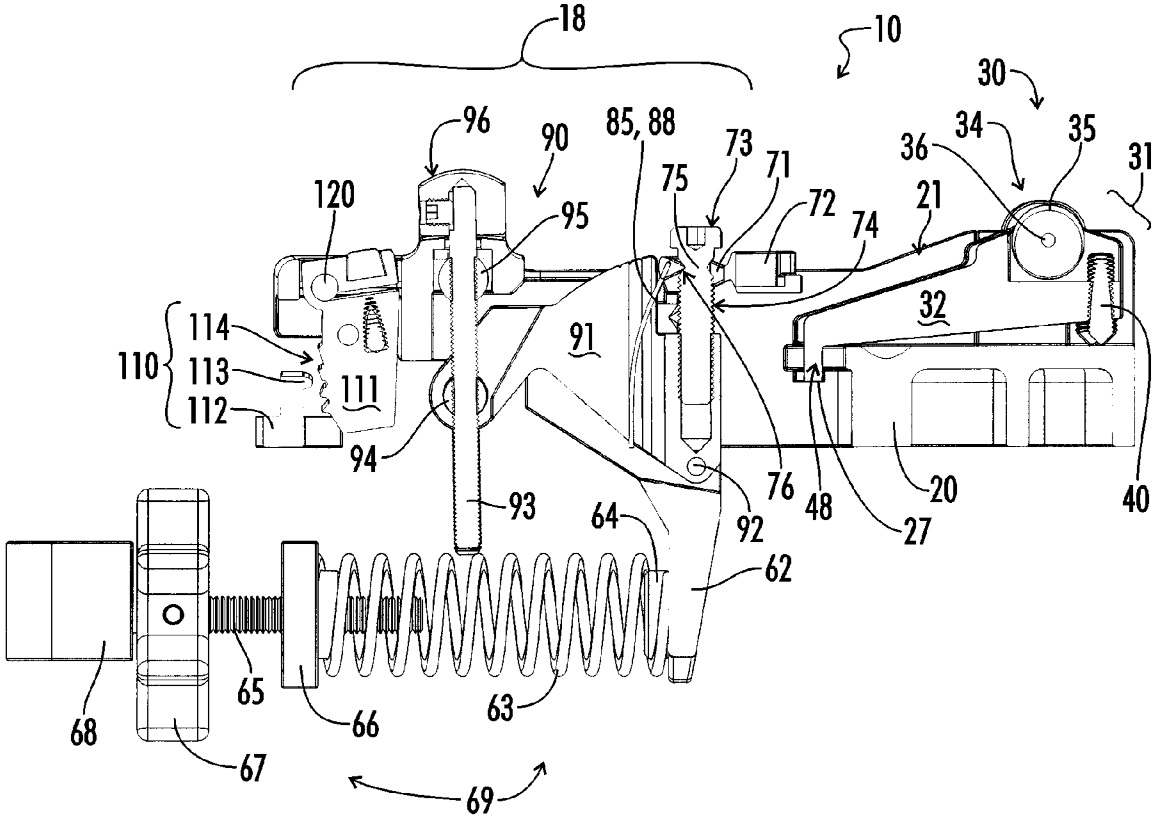

FIG. 6 is a view of the apparatus of FIG. 1 along a longitudinal cross section.

Figure 7:
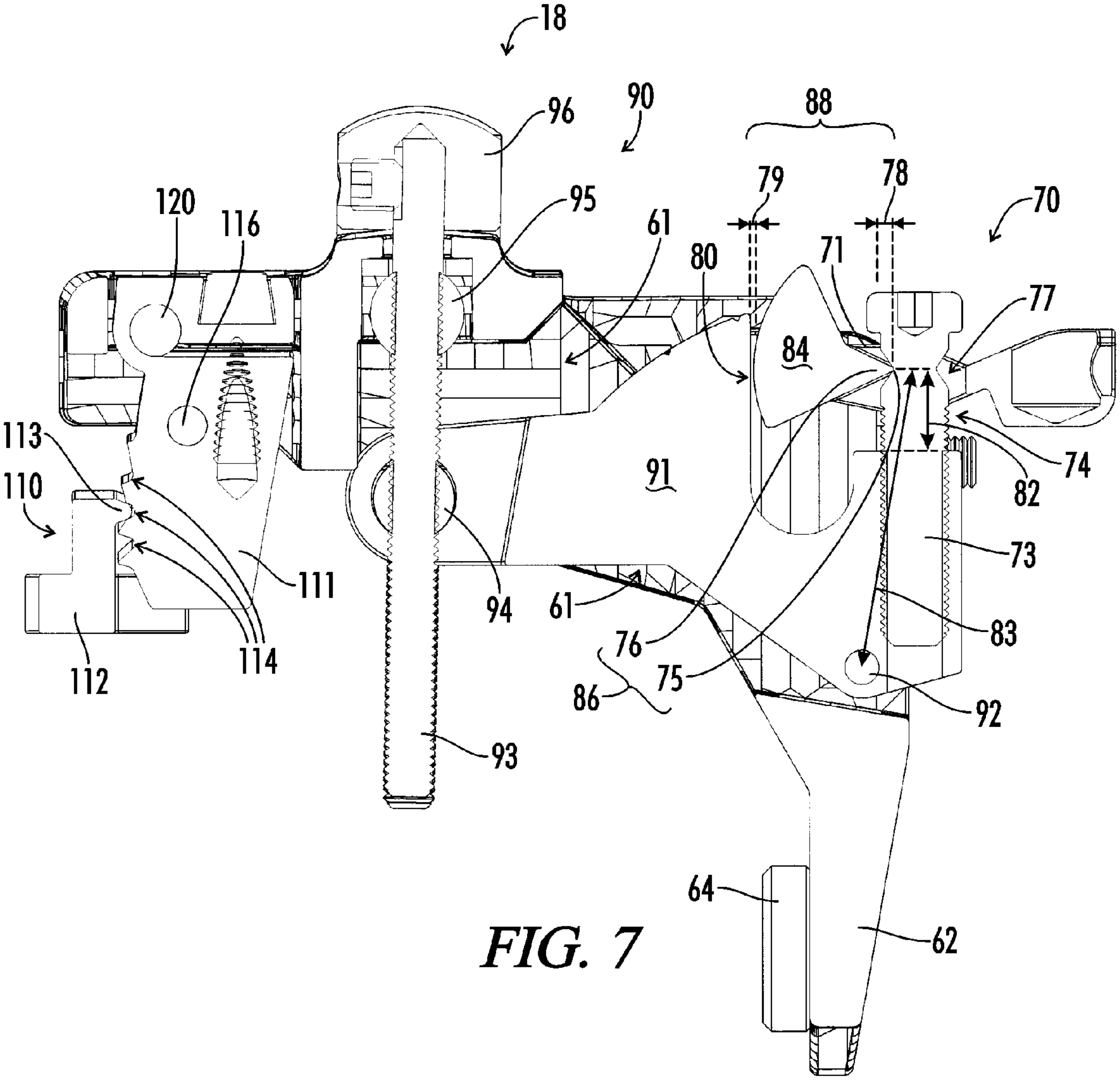

FIG. 7 is a detail view of the apparatus of FIGS. **5*a* and 5*b*** along a longitudinal cross section.

Figure 8:
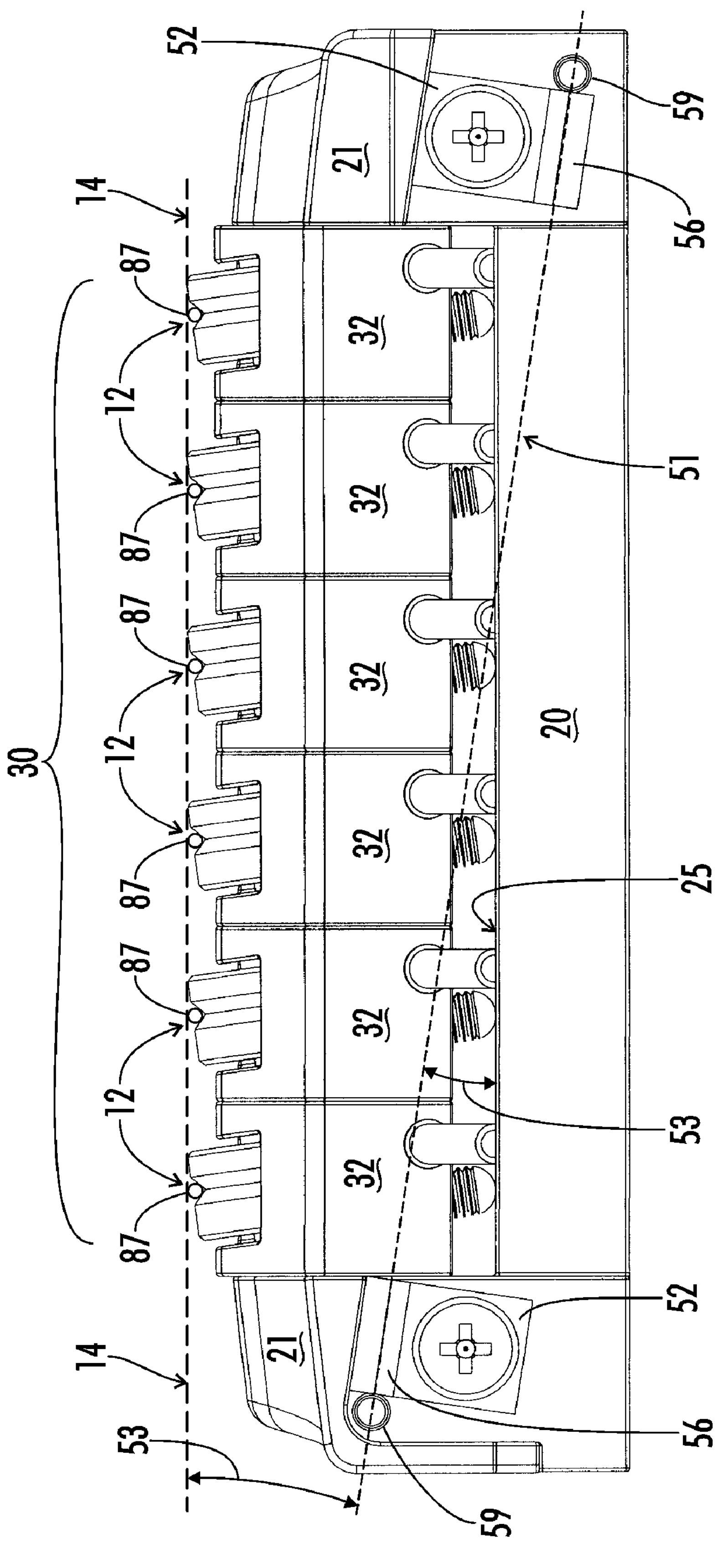

FIG. 8 is a view of the apparatus of FIG. 1 along a transverse cross-section.

Figure 9:
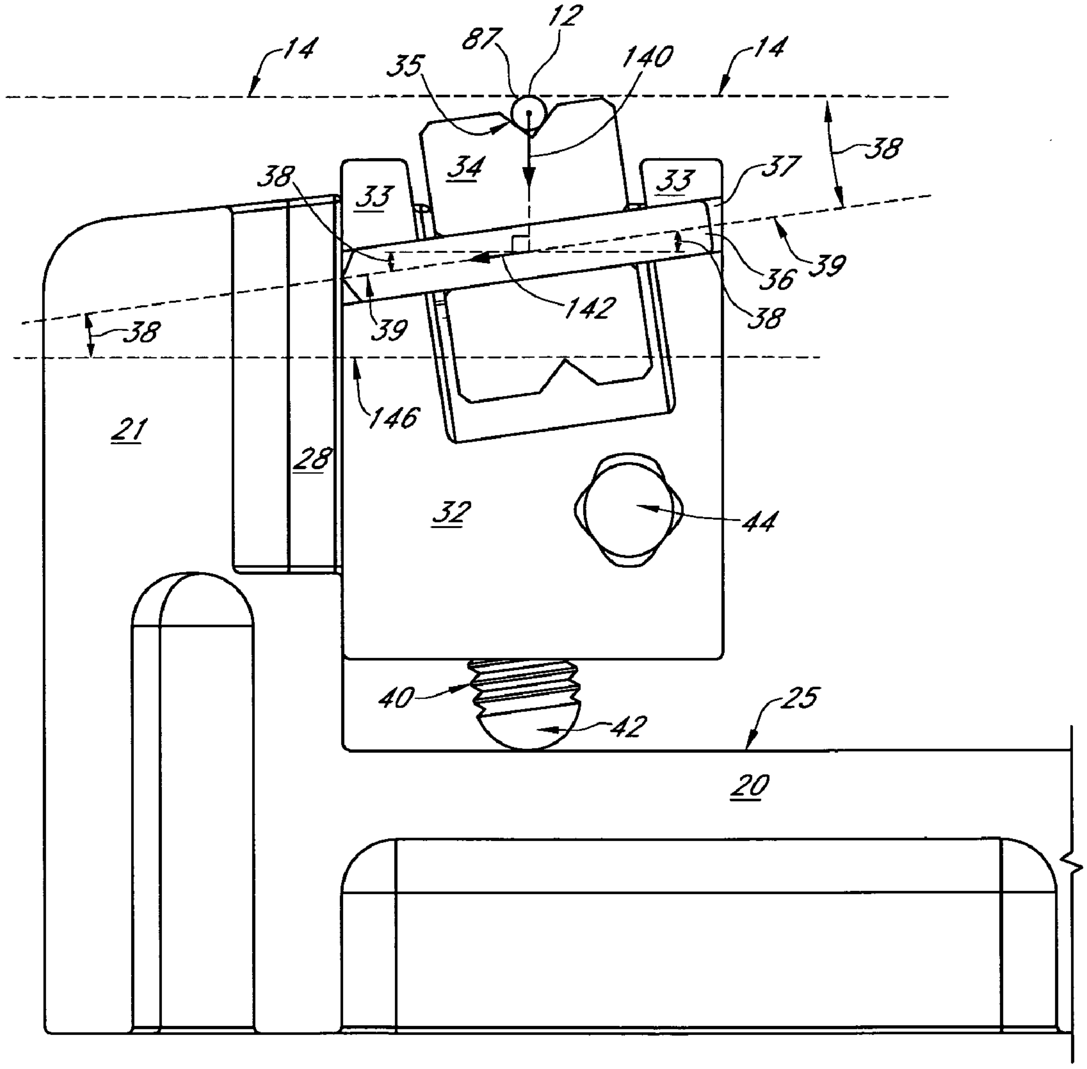

FIG. 9 is a detail view of the apparatus of FIG. 1 along a transverse cross-section.

Figure 10:
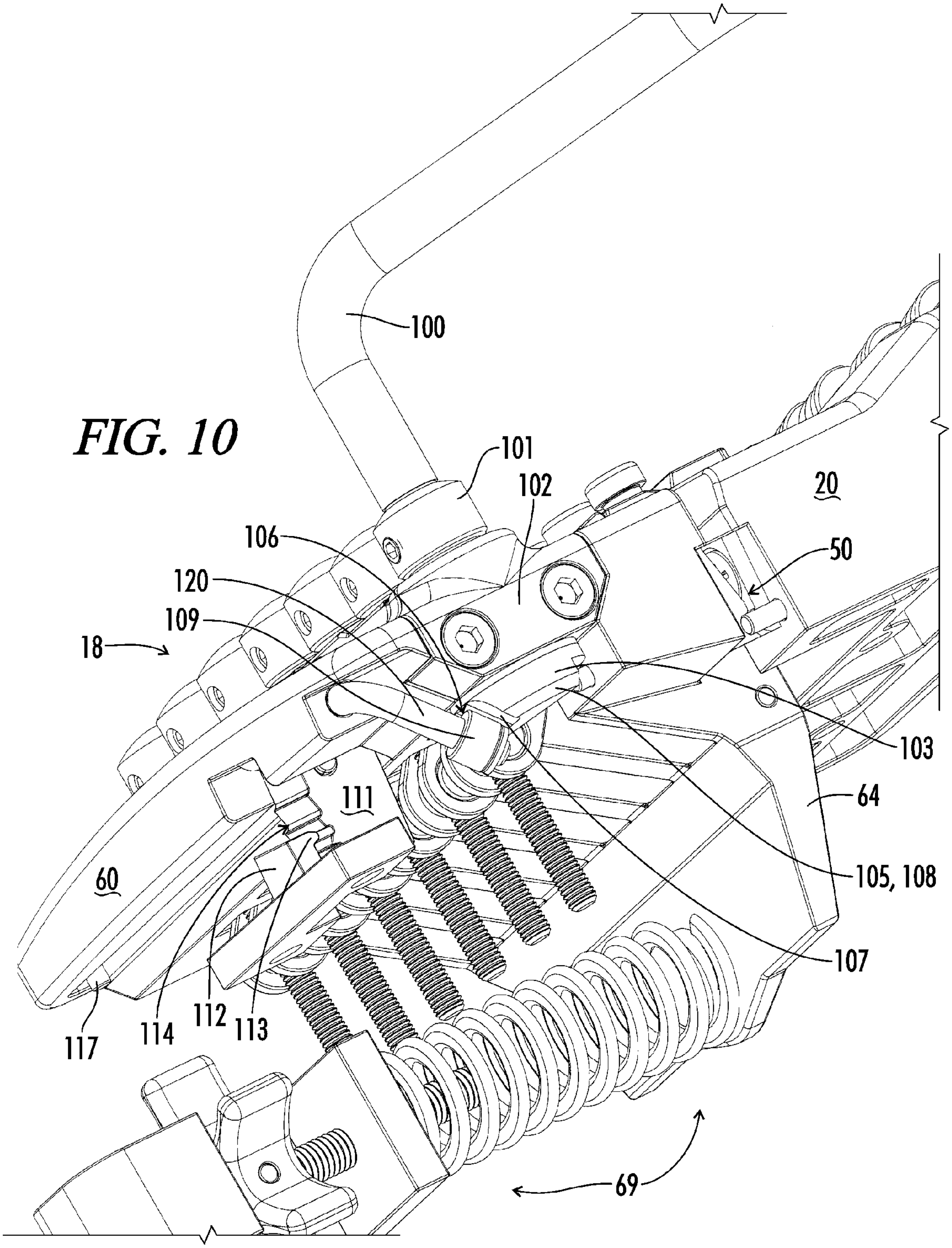

FIG. 10 is an oblique, detail view of the apparatus of FIG. 1 with the tailpiece frame removed to show internal components.

Figure 11:
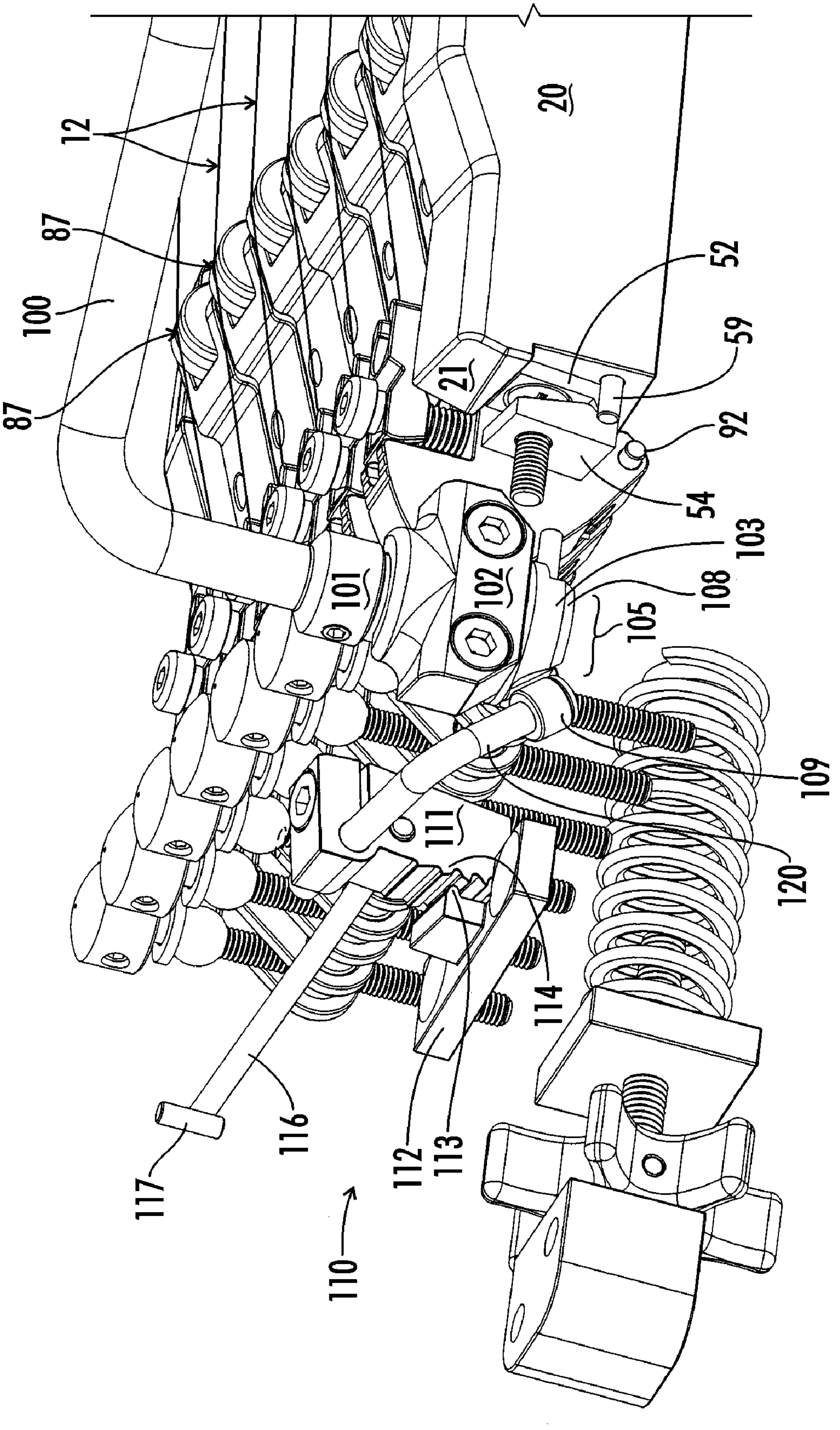

FIG. 11 is an oblique view of the apparatus of FIG. 1 with the tailpiece frame removed to show internal components.

Figure 12:
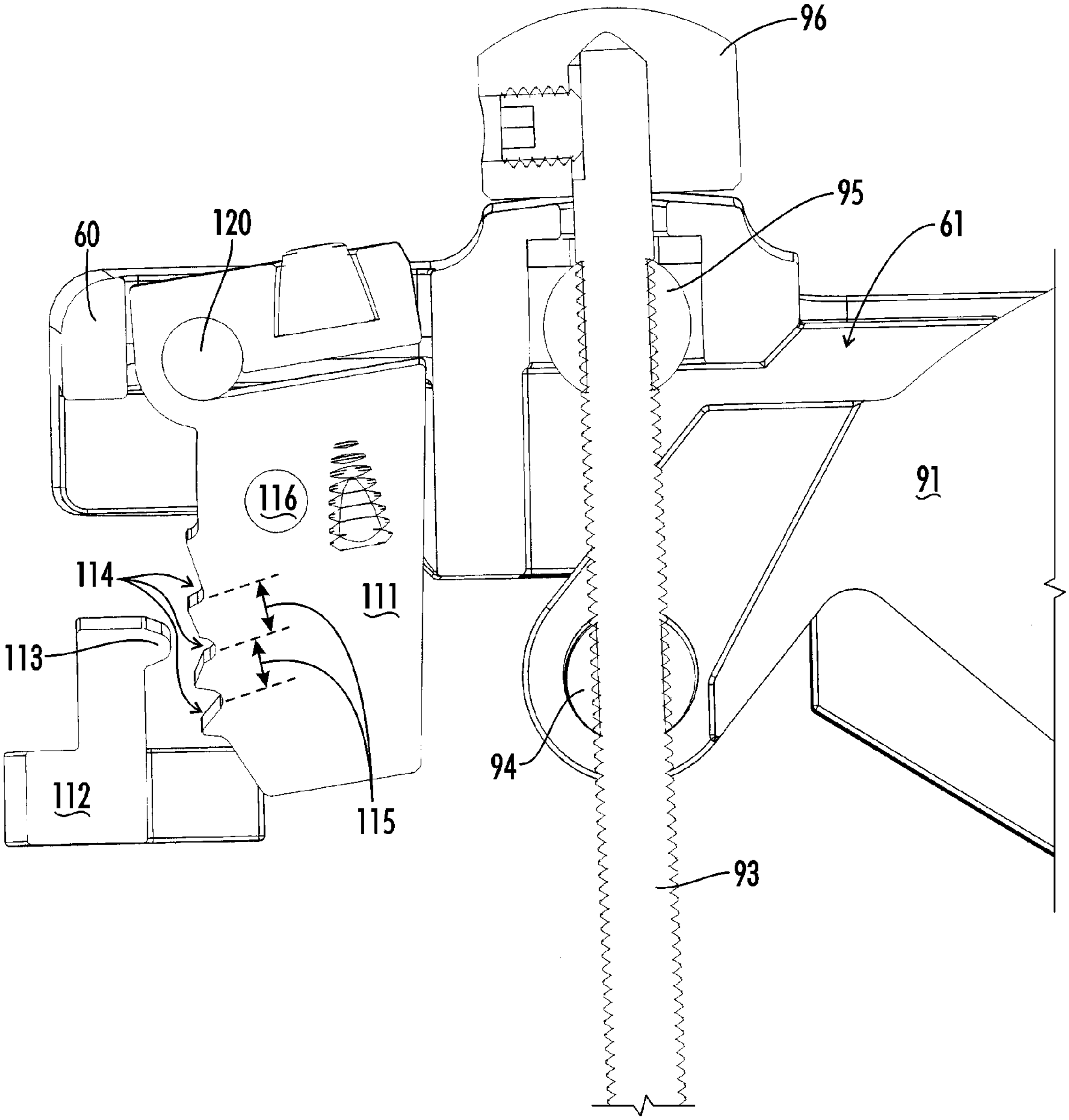

FIG. 12 is a detail view of the apparatus of FIG. 1 along a longitudinal cross-section.

Figure 13:
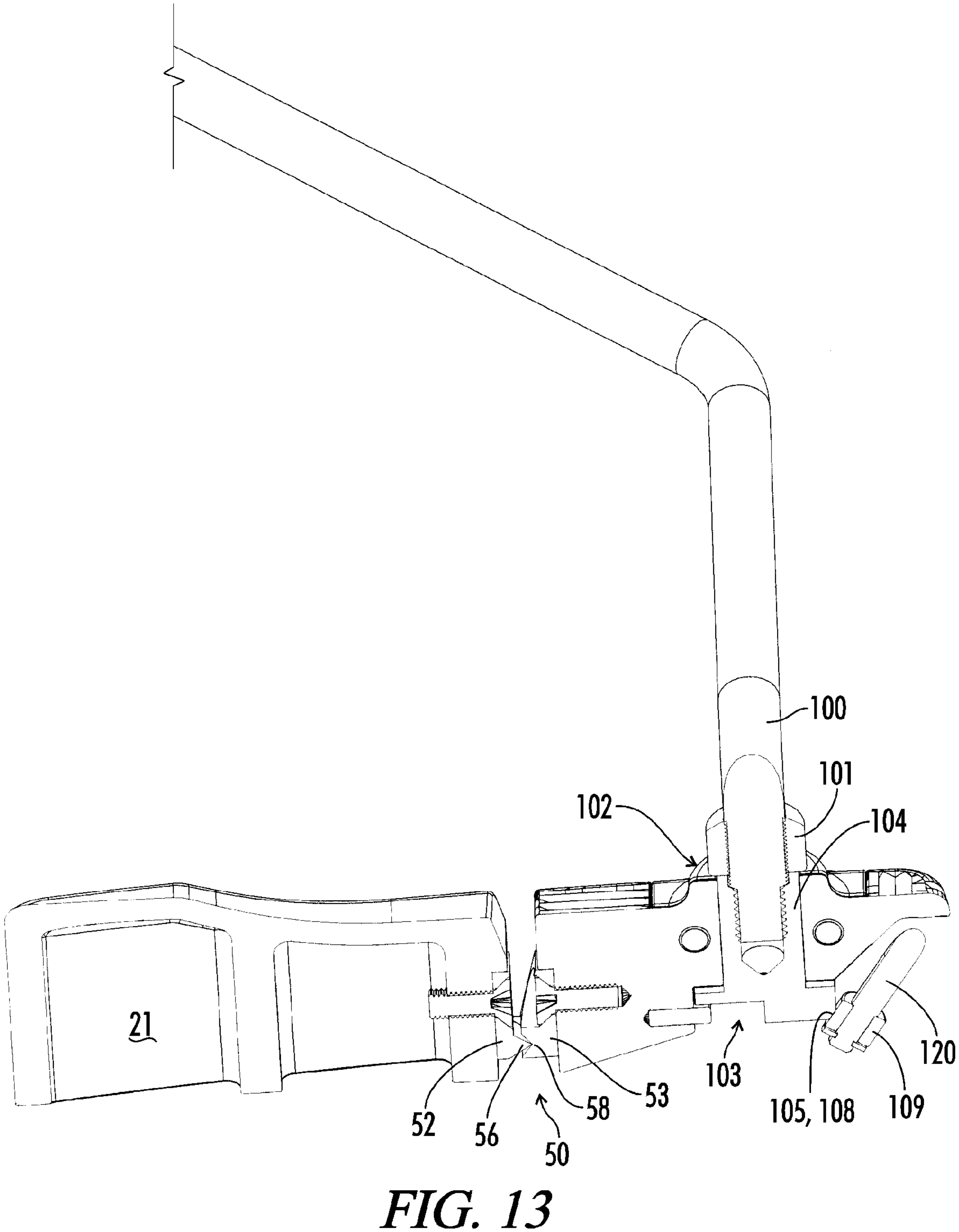

FIG. 13 is a view of the apparatus of FIG. 1 along a longitudinal cross-section showing the cam operating mechanism.

Figure 14:
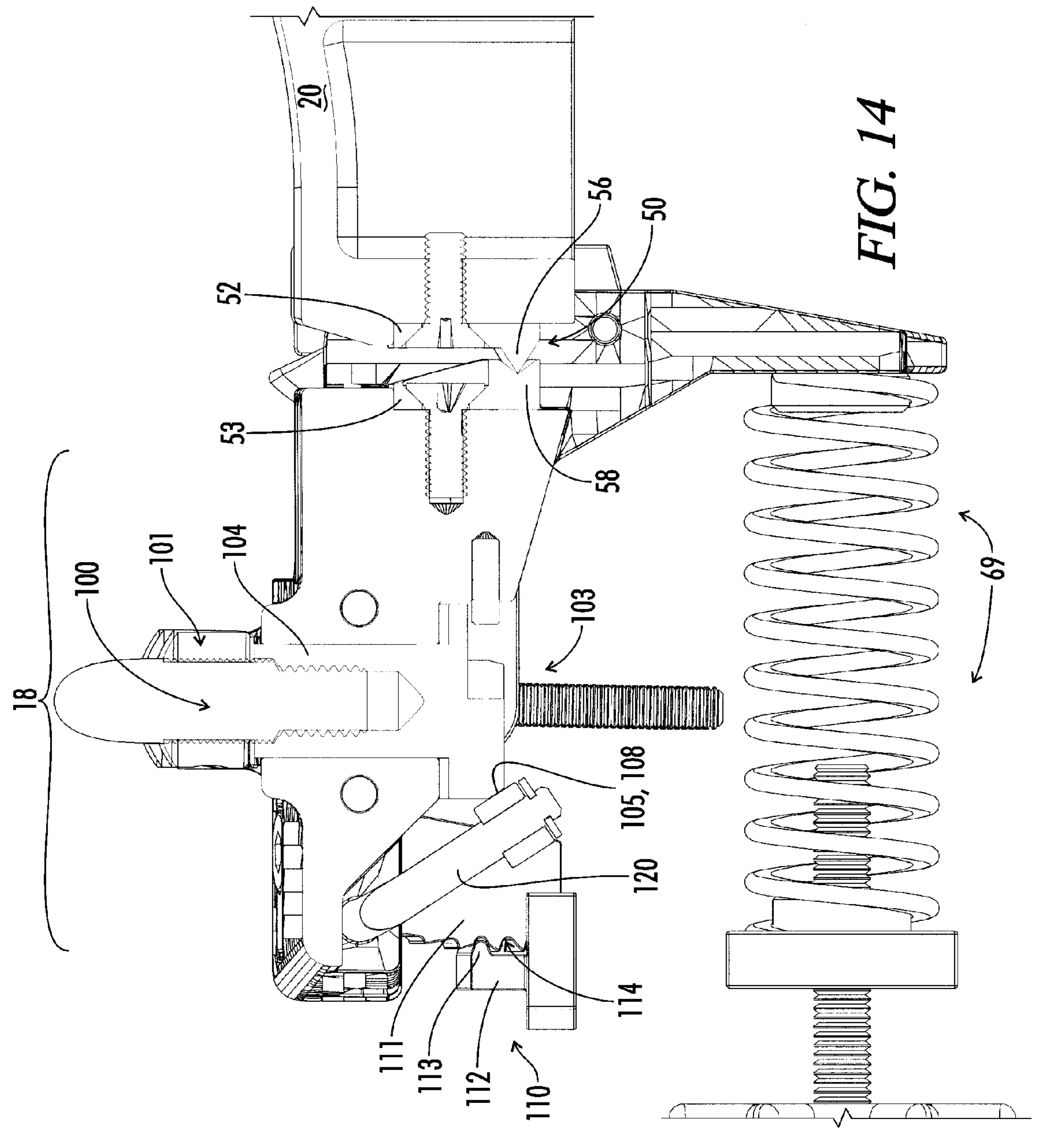

FIG. 14 is a reverse perspective view of the longitudinal cross-section shown in FIG. 13.

Figure 15A:
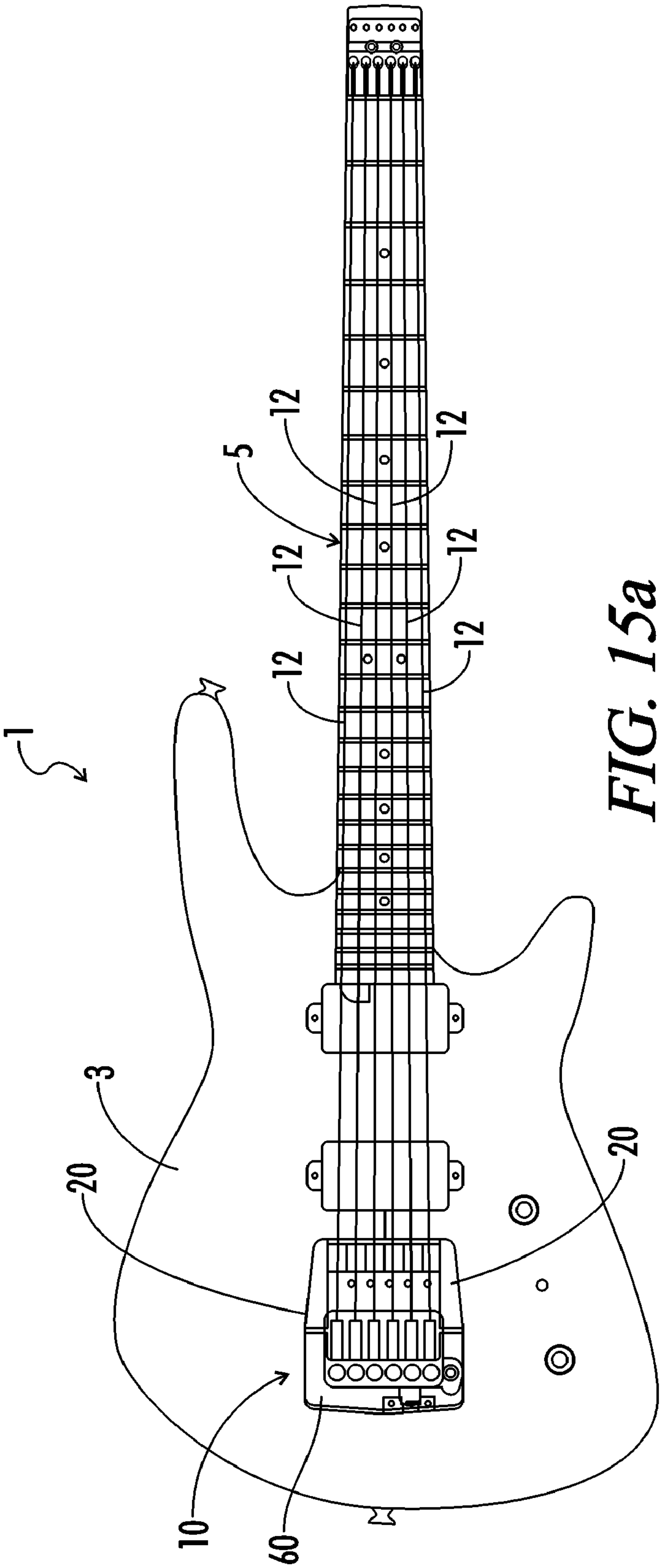

FIG. 15*a* is a plan view of a strung guitar having a tremolo mechanism of the present invention installed thereon.

Figure 15B:
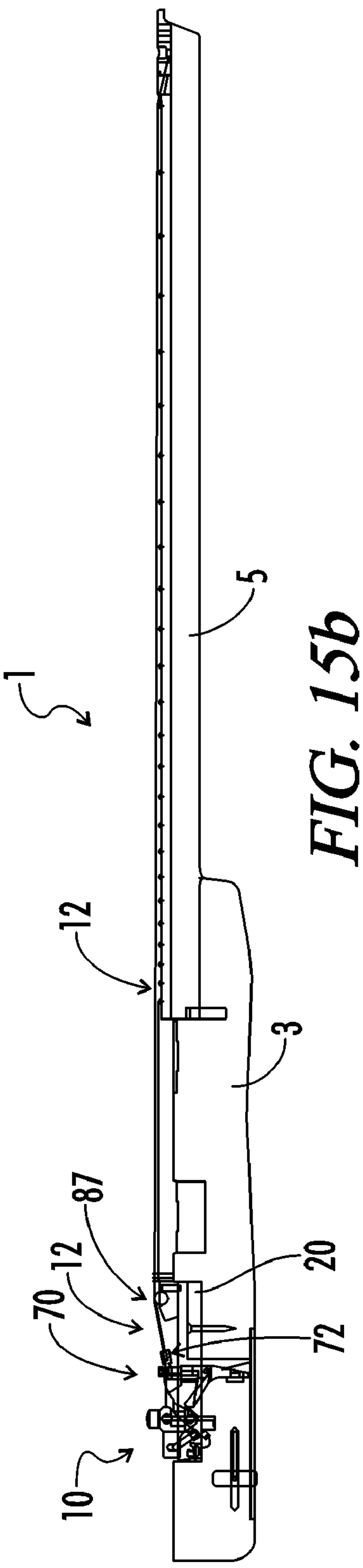

FIG. 15*b* is a longitudinal cross-sectional view of the instrument of FIG. 15*a*.

DETAILED DESCRIPTION OF THE INVENTION

A novel tremolo mechanism 10 of the present invention is shown in FIGS. 15*a* and 15*b* attached to a guitar 1 having a body 3, a neck 5, and a plurality of tensioned strings 12, each string 12 anchored at one end to the neck 5 and extending over the body 3 in a generally parallel manner. A preferred embodiment of the tremolo mechanism 10 of the present invention is shown in FIGS. 1-4. When used with a guitar 1, the tremolo mechanism 10 includes a base 20 mounted to the body 3 of the instrument. The base 20 includes a support surface 25 (see FIG. 8) and two support walls 21 disposed on either side of the base 20. Vibratory endpoints for the plurality of tensioned strings 12 are provided by a bridge 30. The bridge 30 includes a plurality of saddle assemblies 31 disposed on the support surface 25. A saddle clamp 28 aligns the saddle roller assemblies 31 between the support walls 21. Each saddle roller assembly 31 includes a saddle roller 34 having a circumferential seat 35 disposed to receive one of the plurality of tensioned strings.

Alternatively, the base 20 may be a support of any type which will anchor a detuning mechanism to the instrument and allow for pivotal movement thereon. For example, a pair of posts could be attached to the instrument, or the detuning mechanism could be pivotally attached to a bracket or other anchoring device, or directly to the instrument.

The tremolo mechanism 10 further includes tailpiece assembly 18 including a frame 60 carrying a plurality of tuning assemblies 90. The frame 60 is joined to the base 20 by means of a detuning pivot 50 (see FIG. 13), so as to pivot the frame 60 about the base 20 during detuning operation of the tremolo mechanism 10. In the two preferred embodiments shown in FIGS. 1-4 and FIG. 8, the detuning pivot 50 includes a pair of knife edge pivots aligned to define a detuning axis 51 about which the frame 60 rotates relative to the base. The detuning axis 51 is oblique with respect to the string plane 14 and defines a detuning angle 53 therewith.

The frame 60 further includes a plurality of tuning assemblies 90 (see FIG. 5*a*) for anchoring and individually tuning the plurality of tensioned strings 12 of the instrument 1. Each tuning assembly 90 supports a pivoting anchor assembly 70 which is oriented in general alignment with a saddle assembly 31. The pivoting anchor assembly 70 receives and holds the end of a tension string 12 extending from the saddle roller 34 of such saddle assembly 31. The tremolo mechanism 10 also includes a counter-spring assembly 69 providing a spring force upon the frame tongue 62 to balance the reactive tension force of the tensioned strings 12 retained in the pivoting anchor assemblies 70.

Additionally, the tremolo mechanism 10 includes a lock 110 that can be positioned in an unlocked configuration or in any of a plurality of locking configurations, each locking configuration corresponding to a selected radial angle with respect to the detuning axis 53. A tremolo arm 100 is disposed on the frame 60 to facilitate manual pivoting of the tailpiece frame 60 about the detuning pivot axis 51 when the lock 110 is in an unlocked configuration and to facilitate operation of the lock 110.

Saddle Roller with Oblique Roller Angle

Figure 3:
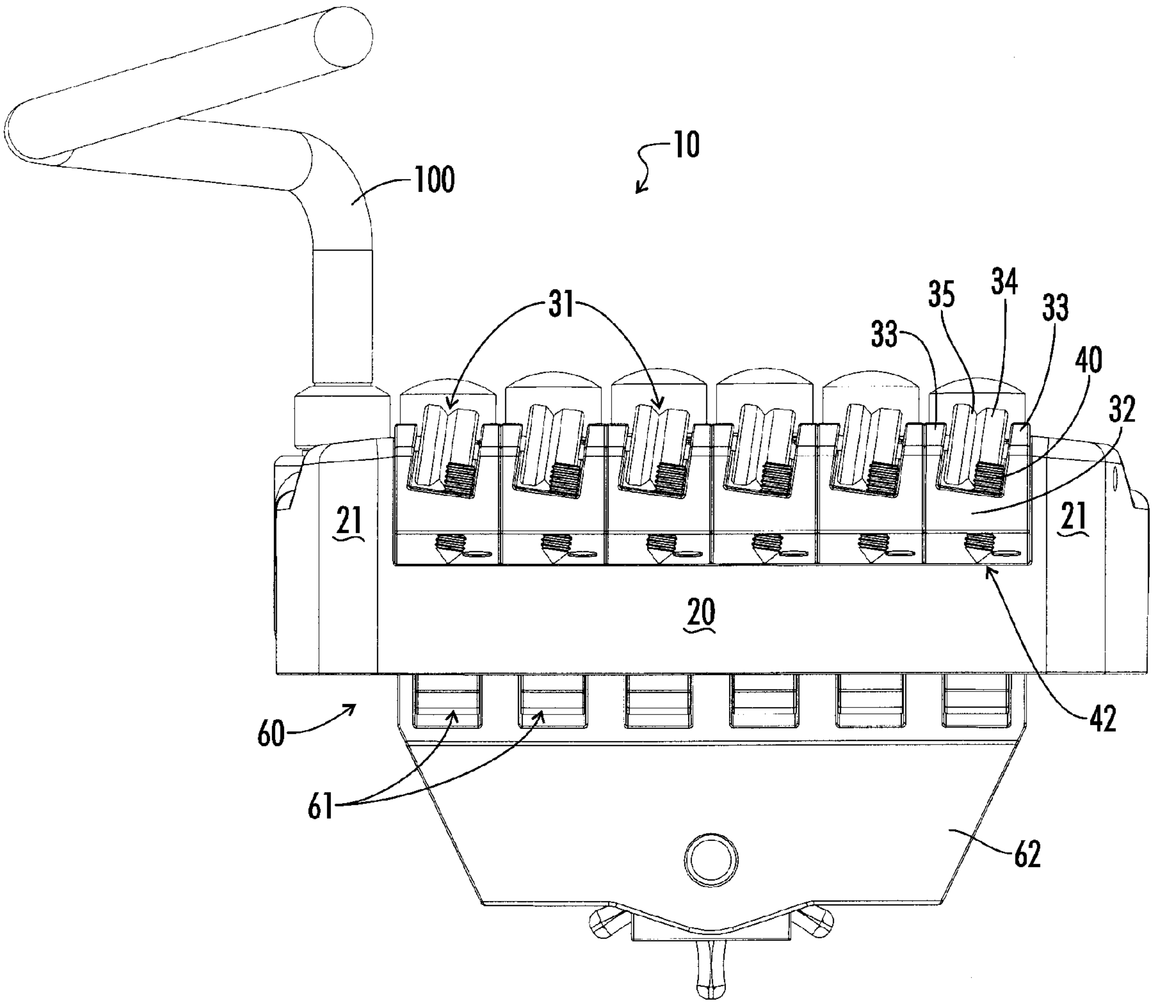
FIG. 3 is a front view of the apparatus of FIG. 1.

Referring now to FIG. 3, each saddle assembly 31 shown includes a saddle block 32 having two opposing block walls 33 which form a roller cavity there between. Referring now to FIGS. 8 and 9, the block walls 33 each have a roller bore 37, the roller bores 37 disposed in alignment along a roller axis 39. The saddle roller 34 of this preferred embodiment includes a cylindrical body attached to an axle, preferably a roller pin 36. The saddle roller 34 further includes a circumferential seat 35 receiving a tension string 12. The roller pin 36 extends across the saddle block cavity and is rotatably disposed in the roller bores 37 such that the saddle roller 34 is disposed in the saddle block cavity. In this configuration, the saddle roller 34 is fixed upon the roller pin and the combination rotates about the roller axis 39.

In the preferred embodiment shown in FIG. 9, the roller bore 37 disposed closest to the support surface 25 extends only partway through the corresponding block wall 33 so as to form a bearing seat while the second roller bore 37 extends completely through the second block wall 33 so as to form an exterior bore opening in the exterior of the second block wall 33. This configuration is useful in assembly of the saddle assembly 31. A saddle roller 43 may be disposed in the roller cavity and a roller pin 38 may be inserted by means of the exterior bore opening, through the second roller bore 37, through an axial bore disposed in the cylindrical body of the saddle roller 34 and into the first roller bore 37. In the preferred embodiments, the saddle roller 43 is press fitted upon the roller pin 36. The roller pin 36 and roller bores 37 are sized and shaped so as to reduce the frictional contact between the roller pin 38 and roller bores 37. The materials comprising the saddle walls 33 and the roller pin 36 are selected to provide rigidity and strength and to reduce friction between the rotating roller pin 36 and the surface of the roller bores 37.

The present invention includes roller supports other than saddle blocks and also includes any device for supporting a bridge roller rotating about a roller axis generally known in the arts. Alternate embodiments of the present invention also include such roller axles and roller combinations as are generally known in the arts. For example, the present invention includes roller axles rotating on journal and thrust bearings disposed within roller bores and further includes rollers rotating about axles fixed in the roller bores.

Referring now to FIG. 9, a saddle assembly 31 is shown disposed upon the support surface 25 and includes a saddle roller 34 disposed on a roller pin 36. The roller pin 36 extends along a roller axis 39 that is oriented so as to extend obliquely with respect to the sliding plane defined by the support surface 25. To illustrate this geometric relationship, a reference line 146 is shown extending parallel to the support surface 25 and intersecting the roller axis 39 so as to define an oblique roller angle 38.

When the tremolo mechanism is installed on an instrument, similar geometric relationships are created between the roller axes 39 of the saddle assemblies 31 and the tensioned strings 12 of the instrument. Referring again to FIG. 9, a tensioned string 12 is shown received in the circumferential seat 35 so as to form a string apex 87. The tensioned string 12 exerts a static force on the roller 34 and further exerts a vibratory force on the roller 34 during oscillatory movement of the string 12. In the transverse, cross-sectional view shown, the tensioned string 12 defines a string axis along the portion of its length extending across the body of the instrument (not shown). The static force is exerted along a static force axis 140 which extends perpendicular to the string axis. The tensioned string 12, in combination with the static force axis 140, further defines a string plane 14 as lying along the string axis and being generally perpendicular to the static force axis 140. In alternate embodiments of the present invention, the string plane is defined by the plurality of strings 12 extending in a parallel manner over the surface of the body 3. The roller axis 39 is oriented so as to be oblique with respect to the string plane 14. As shown in FIG. 9, the string plane 14 intersects the roller axis 39 so as to define an oblique roller angle 38.

The static force exerted on the roller 34 is necessarily transmitted through the roller pin 36 to the support walls 33. According to the principles of vector mechanics, the static force exerted through the roller pin 36 is resolved into a roller axis component 142 exerted along the roller axis 39 of the roller pin 36 and a normal component (not shown) exerted perpendicular to the roller axis 39 of the roller pin 36. The tensioned string additionally exerts a vibratory force during the oscillatory movement of the string while the string is being played by a user. The vibratory force exerted through the roller axis 39 of the roller pin 36 is similarly resolved into an axial component (not shown) exerted along the roller axis 39 of the roller pin 36 and a normal component (not shown) exerted perpendicular to the roller axis 39 of the roller pin 36. As the string 12 vibrates, the axial component of the vibratory force varies in magnitude and direction along the roller axis 39. If, during oscillation of the string 12, the axial component of the vibratory force opposes and exceeds the roller axis component 142 of the static force, the roller 34 and roller pin 36 will vibrate within the roller bore 37 along the roller axis 38.

According to the present invention, the roller axis 39 is disposed with relation to the tensioned string 12 such that the component of the static force 142 directed along the roller axis 39 is generally greater than the component of the vibratory force directed along the roller axis 39. This relationship of the component parts of the saddle assembly 31 prevents vibration of the roller 34 and roller pin 36 along the roller axis 39.

Either experientially or by calculation of the relative values of the maximum oscillatory force to the static force, the roller axis is disposed at a oblique angle 38 determined to be sufficient to create a roller axis component 142 of the static force 142 that is generally greater than the component of the vibratory force directed along the roller axis 39 at any time during the oscillatory movement of the string 12.

The roller angle 38 of preferred embodiments of the present invention includes oblique interior angles between about 3 degrees (3°) to about 30 degrees (30°) with respect to a referenced plane, either the support plane 25 or the string plane 14. A roller angle of about 6 degrees (6°) has been determined to be the preferred roller angle for prototypes of the saddle roller assemblies of the preferred embodiments. At this preferred roller angle, the roller axis component 142 of the static force exerted along the roller pin 36 biases the roller pin 36 into the lower of the roller bores 37. Since this bias is generally greater than the axial component of the vibratory force exerted along the roller pin 36, the roller pin 36 remains seated in the lower of the roller bores 37. This prevents vibration of the saddle roller 34 within the saddle block 32. Advantageously, the roller axis component 142 created by a 6 degree (6°) roller angle does not significantly increase the amount of rotational friction generated by the roller pin 36 rotating with respect to the roller bores 37. In more preferred embodiments of this invention, the saddle pin 36 is narrowed to reduce the total area of contact between the roller bore 37 and the saddle pin 36 and, thus, reduce the amount of rotational friction affecting the saddle roller 34.

This novel feature and advantage of the tremolo mechanism of this invention is a significant improvement over the prior art roller systems. One skilled in the arts would appreciate that the invention includes roller bridge structures providing: a roller disposed so as to rotate around a roller axis; and a tensioned string exerting a static force on the roller and further exerting a vibratory force on the roller during oscillatory movement of such string, wherein, the roller axis is disposed with relation to the tensioned string such that the component of the static force directed along the roller axis is generally greater than the component of the vibratory force directed along the roller axis.

Referring now to FIGS. 5, 6, 8 and 9, the roller support assemblies 31 further include intonation adjustment structures which may be used to adjust the tone of the received strings 12 by displacing the saddle blocks 32, and therefore the saddle rollers 34, with respect to the support surface 25.

One intonation adjustment structure shown is a saddle height screw 40 disposed in a threaded bore extending through the saddle block 32. A portion of the saddle height screw 40 extends beyond the saddle block 32 and slidably engages the support surface 25. In the preferred embodiment shown, the saddle block terminates in a screw cone point 42 which provides a reduced area of contact between the screw 40 and the support surface 25. This reduced area of contact feature reduces any transmission of vibrations between the saddle block 32 and the base 20 and reduces frictional resistance as the saddle block 32 slides over the support surface 25. As the saddle height screw 40 is rotated, the portion of the screw that extends beyond the saddle block 32 is adjusted and the distance between the received tensioned string 12 and the support surface 25 is changed by a proportional amount. Such displacement of the tension string 12 changes the pitch of the string.

One skilled in the art will readily recognize that the present invention includes any saddle height support generally known in the art, including saddle height supports that are not displaceable with respect to the saddle block 32 as well as those supports that are so displaceable.

Referring now to FIG. 6, the saddle block 32 of the first preferred embodiment of the present invention is shown extending towards the detuning pivot 50 along the support surface 25. This extension of the saddle block 32 includes a saddle block foot 48 captured by a retaining channel 27. Adjustment of the saddle height screw 40 of this preferred embodiment causes the saddle block 32 and saddle roller 34 to pivot in an arc of constant radius around the saddle block foot 48. Thus, adjustment of the saddle height screw 40 of this preferred embodiment simultaneously causes displacement of the saddle block 32 longitudinally along the support surface 25 and displacement of saddle block 32 vertically above the support surface 25.

The second preferred embodiment of the present invention is shown in FIGS. 5*a*, 5*b*, 8 and 9 and includes an intonation screw 44 disposed in a threaded bore extending into a saddle block 32. The intonation screw extends generally longitudinally from the saddle block 32 and is received by retaining channel 26 disposed in support surface 25. The intonation screw 44 is terminated in a screw end sphere 46 which is shown disposed in a hemispherical seat in the retaining channel 26. The intonation screw 44 pivots within the hemispherical seat as the screw is retracted or extended from the threaded bore of the saddle block 32. As the intonation screw 44 is operated, it displaces the saddle block 32 longitudinally along the support surface 25. The saddle roller 34 is displaced longitudinally with respect to the received tensioned spring 12 and the position of the vibratory end point along the length of the tensioned string 12 is adjusted accordingly. According to the present invention, the saddle height screw 40 and the intonation screw 44 may be operated independently or in combination as desired to adjust the pitch of the received tensioned string 12.

One skilled in the art will readily recognize that the present invention includes such generally known intonation mechanism as may be used to longitudinally displace a saddle block with respect to the support plate or as may be used to adjust the height of a saddle block with respect to the support plate.

Detuning Pivot

Referring now to FIGS. 8, 11, and 13, a detuning pivot 50 of a preferred embodiment of the tremolo mechanism 10 of the present invention is shown. With the lock 110 in an unlocked configuration, the frame 60 of the tremolo mechanism 10 freely pivots relative to the base 20 by means of the detuning pivot 50 as referenced above. The geometric relationships between the detuning pivot 50 and the support surface 25 and between the detuning pivot 50 and the string plane 14 are shown in FIG. 8. The portion of the detuning pivot 50 attached to the base 20 includes two base plates 52 attached to the base 20 and held in alignment by pivot alignment pin 59. For each base plate 52, a knife edge 56 extends from the base plate 52 along the detuning axis 51, which is oblique with respect to the support surface 25 and which is also oblique with respect to the string plane 14. In the embodiment shown, the plane defined by the support surface 25 is generally parallel to the string plane 14 and the detuning axis intersects both the plane defined by the support surface 25 and the string plane 14 at the same oblique detuning angle 53. Referring now to FIGS. 11 and 13, the tailpiece frame 60 includes two frame plates 54 (one of which is not shown) attached to the frame 60. For each frame plate 54, a knife edge seat 58 extends from the frame plate 54 along the detuning axis 51. Each knife edge seat 58 receives a knife edge 56 so as to form a knife edge pivot. As shown in FIG. 11, with the lock 110 in an unlocked configuration, the pair of aligned knife edges 56 form the detuning axis 51 about which the counter-spring 53 and the tensioned strings 12 of the instrument bias the tailpiece frame 60.

Pivoting String Anchor

Referring now to FIGS. 5*a*, 5*b*, 6 and 7, the tremolo mechanism 10 of the present invention further includes a novel and advantageous pivoting anchor assembly 70. For each tensioned string extending from the bridge 30, a pivoting anchor assembly 70 provides for the continuous, rapid and near frictionless alignment of a knife edge pivot 86, a string end anchor 72 holding a string end, and the string apex 87 in response to changes in the direction and magnitude of the tension force exerted along the tensioned string 12, such changes created as the knife edge pivot 86 is displaced relative to the string apex 87.

Figure 5A:
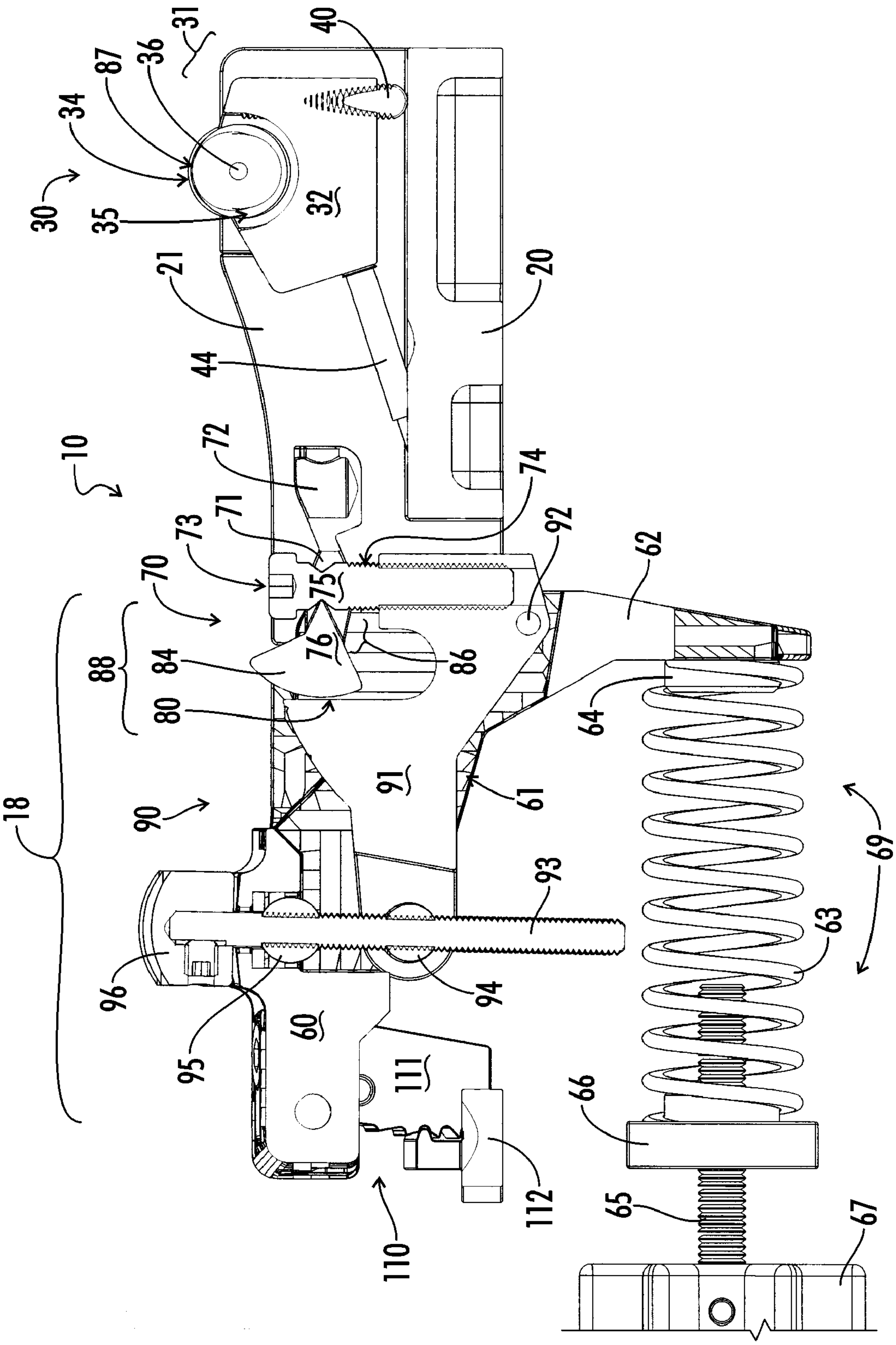
Figure 5B:
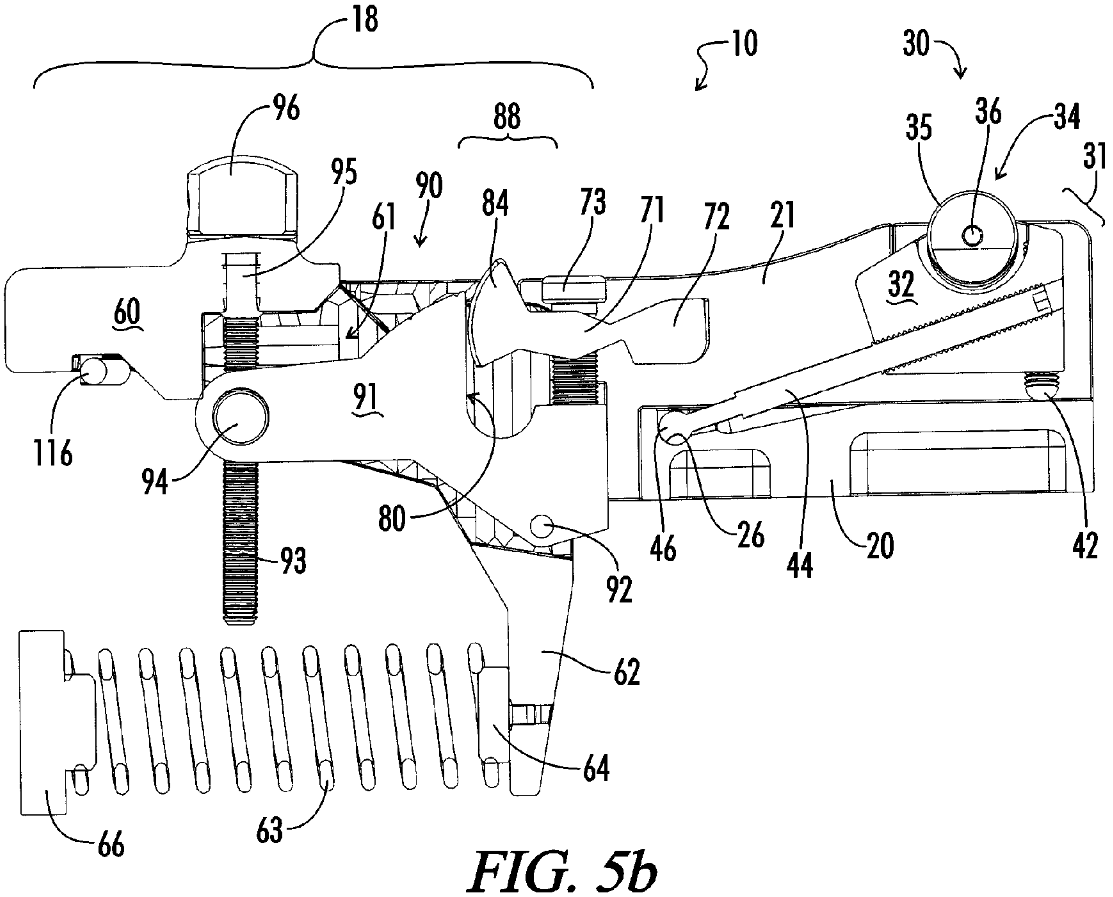

One preferred embodiment of the present invention shown in FIGS. 5*a*, 5*b* and 7 includes, for each tensioned string 12 extending from the bridge 30, a pivoting anchor assembly 70 displaceably disposed upon a tuner arm 91 of a tuning assembly 90. The pivoting anchor assembly 70 of the present invention includes a pivot support structure, a pivot and an anchor structure for receiving and holding an end of a tensioned string 12. In the preferred embodiment shown, the pivoting anchor assembly 70 includes a rate screw 73 disposed in a threaded bore of the tuner arm 91 and extending there from so as to receive and support an anchor block 71. The anchor block 71 includes a string end anchor 72, a jaw opening 77 and further includes a knife edge 76 extending into the jaw opening 77. An upper portion of the rate screw 73 includes a circumferential knife edge seat 75. The upper portion of the rate screw 73 extends through the jaw opening 77 such that the knife edge 76 is received within the knife edge seat 75, so as to form a knife edge pivot 86. With the tremolo mechanism 10 installed on an instrument 1, the string end anchor 72 of the anchor block 71 receives and holds an end of a tension string 12. The knife edge pivot 86 allows the anchor block 71 with the string end anchor 72 to pivot both axially and radially relative to the rate screw 73 in response to changes in the magnitude and direction of the tension force exerted long the tensioned string 12. The changes in the tension force bias the position of the anchor block 71 and string end anchor 72 so as to align the knife edge pivot 86, the string end anchor 72 holding a string end, and the string apex 87.

In alternate embodiments of the present invention, the anchor block 71 is supported by a pivot post fixedly extending from the tuning arm 91. One skilled in the arts would recognize that the present invention includes pivot supports generally known in the art as useful for supporting a pivoting body above a base.

Each pivoting anchor assembly 70 of the preferred embodiment of the invention shown in FIG. 7 includes a knife edge seat 75 adjustably disposed a first offset distance 82 from the tuner arm. With a string end received and held by the string anchor 72, the anchor block 71 pivots about the knife edge seat 75 so as to align the string apex 87 at the bridge seat with the string anchor 72 and the knife edge pivot 76. Operation of the rate screw to 73 to adjust the first offset distance 82 results in a displacement of the knife edge seat 75 and, thus, the pivoting anchor assembly 70 relative to the string apex 87. This displacement tends to change tension forces in the string 12 which, in turn, changes the reactive bias exerted by the string 12 upon the string anchor 72. Since alignment of the knife edge pivot 86, the string anchor 72 and the string apex of the bridge seat minimizes the tension in the string 12, the result is an automatic and continuous change in the pivot angle of the string end pivot 70 relative to the rate screw 73 so as to maintain the alignment of the knife edge pivot 86, the string anchor 72 and the string apex of the bridge seat.

Each pivoting anchor assembly 70 of the preferred embodiment of the invention shown in FIG. 7 also includes the knife edge seat 75 adjustably disposed at a second offset distance 83 from the tuner arm shaft 92. Operation of the rate screw to 73 to adjust the first offset distance 82 will necessarily adjust the second offset distance 83 and result in a displacement of, the pivoting anchor assembly 70 relative to the tuner arm shaft 92 as well as relative to the string apex 87.

Further, adjustment of the tuning assembly 90 so as to pivot the tuner arm 91 around the tuner arm shaft 92 provides a second mechanism for changing the position of the pivoting anchor assembly 70 relative to the string apex 87. As shown in FIGS. 2, 5*a*, 5*b* and FIG. 7 the tuner arm 91 extends longitudinally through a channel 61 in the tailpiece frame 60. A tuner nut 94 is disposed in a bore extending though the tuner arm 91 and receives a tuner screw 93 extending through a threaded bore within the tuner nut 94. The tuner screw 93 extends though a threaded bore disposed in a tuner ball 95, the tuner ball 95 being disposed within the tailpiece frame 60 so as to allow rotation of the tuner ball 95 without longitudinal displacement of the tuner screw 93 relative to the frame 60. A tuner knob 96 is affixed to one end of the tuner screw 93. Rotation of the tuner knob 96 by an operator rotates the tuner screw 93 so as to displace the tuner nut 94 along the length of the tuner screw 93.

This linear displacement of the tuner nut 94 causes the tuner arm 91 to pivot about the tuner arm shaft 92. As the tuner arm 91 pivots, it is displaced relative to the tailpiece frame 60 and, thus, relative to the string apex 87. With the rate screw 73 disposed on the tuner arm 91, operation of the tuner knob 96 rotates the knife edge seat 75 and, thus, the pivoting anchor assembly 70 about the tuner arm shaft 92. Such rotational displacement of the pivoting anchor assembly 70 relative to the string apex 87 tends to change the tension forces exerted along the tensioned string 12 as described above, and results in an automatic and continuous change in the pivot angle of the string end pivot 70 relative to the rate screw 73, so as to maintain the alignment of the knife edge pivot 86, the string anchor 72 and the string apex of the bridge seat.

A third mechanism for changing the position of the pivoting anchor assembly 70 relative to the string apex is operation of the tremolo mechanism 10 as described above. The frame 60 and all its pivoting anchor assemblies 70 are rotated about the detuning axis 51 with respect to the base 20. With a string end received and held by the string anchor 72 of each pivoting anchor assembly 70, rotation of the frame 60 about the base 20 causes each anchor block 71 to pivot about its knife edge seat 86 so as to align the corresponding string apex 87 with the string anchor 72 and the knife edge pivot 76.

An additional novel feature of the tremolo mechanism 10 of this invention includes the block retainer assembly 88 which limits the displacement of the knife edge 76 from the knife edge seat 75. In the embodiment shown in FIG. 7 the block retainer assembly 88 includes a retaining surface 80 disposed on the tuner arm 91 and further includes a trailing portion 84 of the anchor block 71. The trailing portion extends towards the retaining surface 80 and is separated there from by a clearance distance 79. The seat depth 78 is generally greater than the clearance distance such that displacement of the knife edge 76 from the knife edge seat 75 is limited by contact of the trailing portion 84 with the retaining surface 80 while maintaining the knife edge 76 within a portion of the knife edge seat 75. Of note, the knife edge seat 75 is tapered so as to allow a wide range of angular displacement of the anchor block 71 about the knife edge pivot 86 and in longitudinal alignment with the rate screw. Further, in the preferred embodiment shown in FIG. 7, the knife edge seat 75 is circumferential with respect to the rate screw so as to allow the anchor block 71 to pivot radially relative to the rate screw 73. In alternate embodiments of the present invention the knife edge seat 75 spans only a portion of the circumference of the rate screw 73. In other alternate embodiments, the knife edge seat 75 is a linear channel disposed in the rate screw 73.

Referring now to FIG. 6, a second preferred embodiment of the present invention is shown including a block retaining assembly 88 comprising a retaining spring 85 extending from the tuner arm 91 and engaging the anchor block 71 so as to bias the knife edge 76 against the knife edge seat.

Cam Actuated Tremolo Lock Providing Half Step Pitch Variations

The lock of the tremolo mechanism of the present invention includes fixed and movable subparts having opposing first and second engagement surfaces disposed thereon. Intermeshing ridges and channels are disposed on the first and second engagement surfaces such that the lock is selectably configurable in a plurality of configurations.

According to the present invention, with the lock disposed in an unengaged configuration, the first and second engagement surfaces are separated so as to allow the frame to pivot relative to the base. Such rotation of the frame causes the first engagement surface to be displaced transversely relative to the second engagement surface. In each of a plurality of engaged configurations, the first and second engagement surfaces are pressed together so as to prevent the frame from pivoting relative to the base.

Referring now to FIGS. 6, 7 and 10-14, the tremolo mechanism 10 of a preferred embodiment of the present invention is shown including a lock 110 having a moveable locking arm 111 and a fixed locking block 112. The movable locking arm 112 is disposed within the frame 60 and a plurality of parallel locking channels 114 are disposed on an engagement surface of the movable locking arm 111. A locking ridge 113 is disposed upon the locking block 112 so as to be in aligned opposition with the locking channels 114. In a more preferred embodiment of the present invention, the locking channels 114 and the locking ridge 113 are disposed so as to be parallel with the detuning axis 51 and the locking arm 111 is disposed on a torsion bar 120 that extends parallel to the detuning axis. This alignment is necessary to ensure the locking ridge 113 intermeshes with any locking channel 113 positioned for engagement with the locking ridge 113.

A preferred embodiment of the present invention shown in FIG. 12 illustrates the lock 110 of the present invention disposed in an unlocked configuration. The locking block 112 and the locking arm 111 are separated so as to allow the tailpiece frame 60 to pivot about the base 20. With the lock 110 in a locking configuration, as shown in FIG. 14, the locking arm 111 is rotated towards the locking block 112 such that the locking ridge 113 is inserted into a locking channel 114. The plurality of locking channels 114 are separated by a spacing distance 115 between the locking channels 114. Thus, a plurality of locking configurations is available for selection by a user. Further, for each of the engaged configurations, the frame 60 is disposed at a selected angular displacement of the frame 60 about the detuning axis 51 and the first and second engagement are pressed together such that locking ridge 113 intermeshes with such channel 114 as corresponds to the selected angular displacement of the frame 60.

A novel feature of the lock 110 of the tremolo mechanism 10 is illustrated in the preferred embodiment shown in FIGS. 6, 7 and 10-14. The lock 110 is disposed at a portion of the frame 60 generally most distal to the detuning axis 51 and the locking channels 114 are separated by a spacing distance 115 such that transverse displacement of the locking arm 111 relative to the locking ridge 113 by a spacing distance 115 provides such angular displacement of the frame 60 about the detuning axis 51 as to cause a chromatic half step change in the pitch of each of the plurality of tensioned strings.

Moreover, each of the plurality of locking channels 114 provides a positive control of the locking ridge 113 against movement in either direction. The prior art provided only a single, central locking channel with spring-biased locking positions above and below the central locking channel. The prior art provided for a tuned equilibrium position only corresponding to a single locking channel. The novel lock 110 of the present invention allows the tuned equilibrium position to be set so as to correspond to any of the plurality of locking channels 114. This provides the novel advantage of being able to shift the pitch of each of the plurality of tensioned strings 12 in chromatic half steps as the tremolo mechanism 10 is shifted between sequential locking configurations corresponding to locking channels 114 above and/or below the locking channel 114 selected for equilibrium tuning.

Alternate embodiments of the present invention provide for the plurality of parallel channels disposed on the locking block and the locking ridge disposed on the locking arm. One skilled in the arts would recognize that the novel and advantageous lock of the present invention includes locks having first and second engagement surfaces that include opposing interlocking features which, on at least one such engagement surface, are interspaced by a spacing distance and which align and interlock at selected transverse displacements of the first and second engagement surfaces. Further, such transverse displacement of the first engagement surface relative to the second engagement surface by such a spacing distance provides such angular displacement of the frame about the detuning axis so as to cause a chromatic half step change in the pitch of each of the plurality of tensioned strings.

Referring again to FIGS. 10 and 11, the lock 110 of the preferred embodiment shown further includes a locking spring 116 connected at one end to the frame 60 and is held in place by tail pin 117. At its other end, the locking spring 116 is connected to the locking arm 111 and biasing the locking arm 111 away from the locking block 112 so as to place the lock 110 in an unengaged configuration.

The user can position the lock 110 in either the unengaged position or in any of the plurality of engaged positions by using a tremolo arm 100 to pivot tailpiece frame 60 to the desired radial angle of rotation with respect to the detuning axis 51 and then rotating the tremolo arm 110 so as to operate a cam actuator 103 to position a torsion bar 120 connected to the locking arm 111, so as to engage or disengage the locking arm 111, from the locking block 112.

The tremolo arm 100 is connected to a release cam 103 as shown in FIGS. 13 and 14. A threaded portion of the tremolo arm 100 is disposed in a threaded bore of the cylindrical body 104 of the release cam 103. The tremolo arm 100 is secured in place by means of an arm nut 101 threadably fastened on the tremolo arm 100, so as to prevent disengagement of the tremolo arm 100 from the cylindrical body 104. The release cam 103 further includes the cylindrical body 104 upon which a cam profile 105 is positioned.

Figure 4:
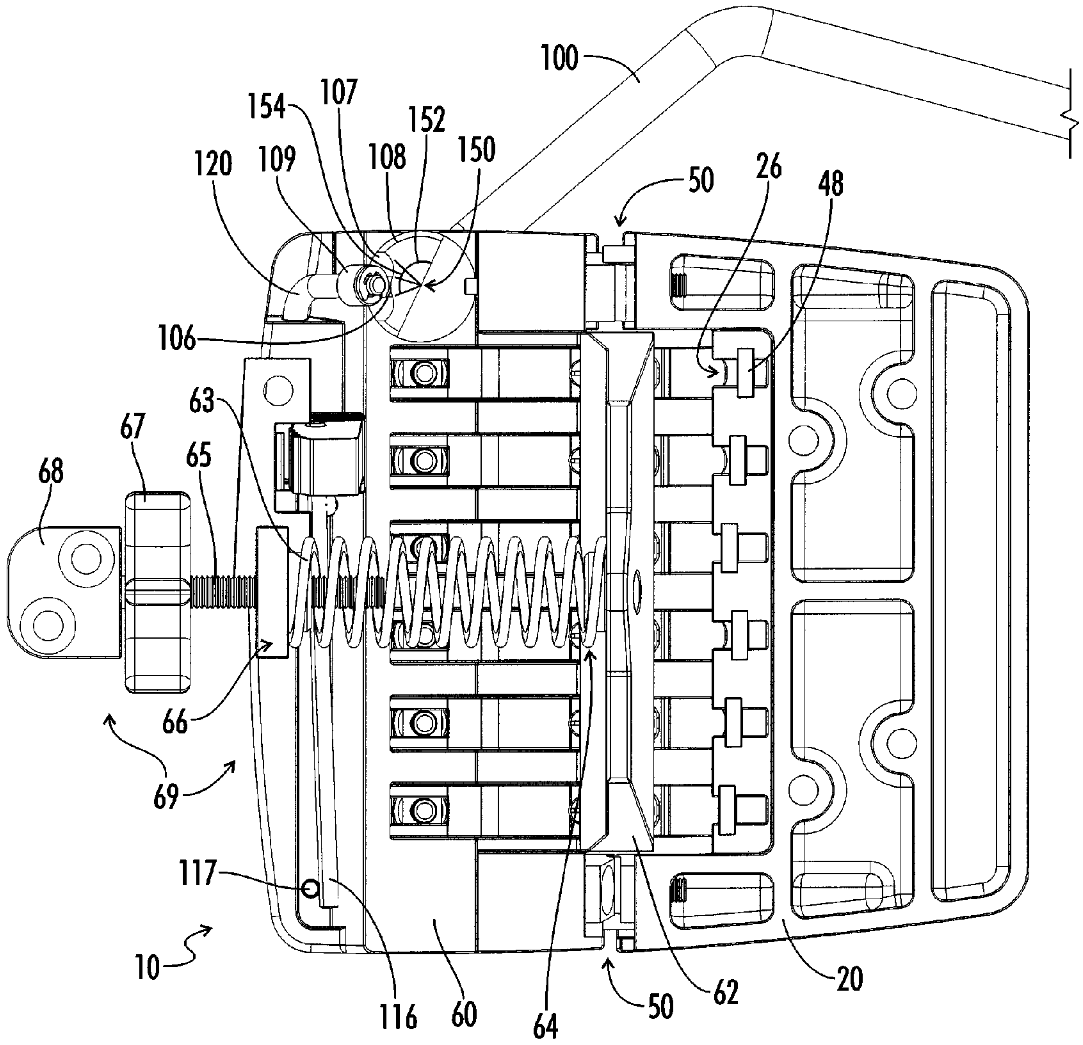
FIG. 4 is a bottom view of the apparatus of FIG. 1.

Referring now to FIGS. 4, 10 and 11, the cam profile 105 shown includes an actuation seat 107 connecting an unlocked seat 106 with a locked seat 108. The tremolo mechanism 10 is shown in an unengaged configuration with a cam follower 109 received in the unlocked seat 106. The cam follower 109 is disposed upon one end of a torsion bar 120. The unlocked seat 106 is disposed at a first constant radius with regards to the axis of the cylindrical body 104. The locked seat 108 is disposed at a second constant radius with regards to the axis of the cylindrical body 104. The actuation seat 107 has a radius increasing from the first radius to the second radius as the actuation seat 107 spans from the unlocked seat 106 to the locked seat 108. The torsion bar 120 is connected at its other end to the locking arm 111. The locking arm 111 is not directly connected to the frame, thus the locking spring 116 supports and biases both the locking arm 111 and the torsion bar 120 that extends from the locking arm 111 such that the cam follower 109 is biased against the cam profile 105.

The rotation of the tremolo arm 100 to place the lock 110 in an engaged configuration rotates the cam profile 105 beneath the cam follower 109 from the unlocked seat 106 to the locked seat 108. The cam follower 109 is displaced radially from the first radius to the second radius. This radial displacement produces a lateral displacement of the torsion bar 120 and the locking arm 111 so as to engage a selected locking channel 114 with the locking ridge 113. Such radial displacement further produces a loading torque on the torsion arm 120 which is reactively transferred to the locking arm 111 so as to hold and secure the locking arm 111 against the locking block 112.

Referring again to FIGS. 4, 10 and 11, the preferred embodiment of the tremolo mechanism 10 is shown in the unengaged configuration with the tremolo arm 100 extending over the frame 60 and generally parallel with the tensioned strings 12. In this position, the tremolo arm 100 is a lever providing a mechanical advantage to the user in rotating the frame 60 about the base 20. Referring now to FIGS. 13 and 14, the preferred embodiment of the tremolo mechanism 10 is shown in an engaged configuration with the tremolo arm 100 rotated to a position extending away from the tailpiece frame 60 in a direction generally perpendicular to the tensioned strings 12, so as to remove the tremolo arm 100 from the play of the tensioned strings 12 by the user. In this position, the tremolo arm 100 provides no mechanical advantage to the user in rotating the frame 60 about the base 20. If desired, with the lock 110 in an engaged configuration, the tremolo arm nut 101 can be loosed and the tremolo arm 100 removed from the mechanism.

A second novel feature of the lock 110 of tremolo mechanism 10 is the unique combination of the radial spans of the unlocked seat 106, actuation seat 107 and locked seat 108. According to the present invention, the actuation seat 107 spans a radial angle of between about ten degrees (10°) and about thirty degrees (30°) with respect to the cylinder axis. The preferred span of the actuation seat 107 of the embodiment of the present invention illustrated in FIG. 4 is a radial angle of about twenty three degrees (23°) with respect to the cylinder axis. Moreover, the locking arm 111 engages the locking block 112 when the cam follower 109 is disposed on the actuation seat 107 at greater than eight degrees (8°) from the unlocked seat 106. According to the present invention the locked seat 108 spans a radial angle of at least about twenty five degrees (25°) with respect to the cylinder axis. The preferred span of the locked seat 108 of the embodiment of the present invention illustrated in FIG. 4 is a radial angle of about seventy two degrees (72°) with respect to the cylinder axis. According to the present invention the unlocked seat 106 spans a radial angle of between about twenty degrees (20°) and about sixty degrees (60°) with respect to the cylinder axis. The preferred span of the unlocked seat 106 of the embodiment of the present invention illustrated in FIG. 4 is a radial angle of about forty degrees (40°) with respect to the cylinder axis. Advantageously, the combination of the radial spans of the actuation seat 107 and locked seat 108 provides for actuation of the lock 110 over a short arc of operator motion and further provides for a positioning of the tremolo arm well out of the area of play once the lock is engaged. Also, by restricting the radial span of the unlocked seat 106, the tremolo arm 100 may be restricted to extending in a direction generally over the detuning axis so as to provide an effective lever for operating the tremolo mechanism 10 to creating a vibrato effect.

The cam actuated lock of the present invention accommodates misalignments by the user by means of a third novel feature of the present invention shown in FIGS. 11 and 14.

The locking channels 114 of the locking arm 111 are separated by lands which are shaped to direct the locking ridge 113 towards a locking channel 114 if the locking ridge 113 first contacts a land beside a locking channel 114 during in the locking process. The torsion arm 120 shown provides a flexible means of applying a motive force for moving the locking arm 111 into a locked configuration. According to the present invention if the locking ridge 113 and a selected locking channel 114 are misaligned and the cam cylinder 104 is rotated such that the cam follower 109 is disposed upon the locked seat 108, the torsion bar 120 elastically deforms as the locking ridge 113 is received by a land between the locking channels 114 without damaging the lock 110. Further, any additional transverse movement of the locking arm 111 relative to the locking block 112 causes the locking ridge 113 to slide across the land and seat in an adjacent locking channel 114. Prior art locking mechanisms have rigid mechanical connections that, if misaligned during locking, would either be damaged or would fail to lock. Advantageously, the cam actuated lock of the present invention accommodates misalignments by the user without neither damage to the lock nor failure to lock.

As can be readily seen by those skilled in the art, various modifications and variations could be made in the tremolo mechanism of the invention without departing from the scope or spirit of the invention.

Thus, although there have been described particular embodiments of the present invention of a new and useful Tremolo Mechanism for a Stringed Musical Instrument it is not intended that such references be construed as limitations upon the scope of this invention except as set forth in the following claims.

Thus, although there have been described particular embodiments of the present invention of a new and useful Tremolo Mechanism For A Stringed Musical Instrument With Angled Saddle Rollers, it is not intended that such references be construed as limitations upon the scope of this invention except as set forth in the following claims.

What is claimed is:

1. An apparatus comprising:

a body;

a neck extending from the body;

a plurality of tensioned strings attached to the neck and extending over the body;

a base disposed on the body, the plurality of tensioned strings extending over the base, wherein the base includes a base support surface defining a support plane; and a roller bridge disposed upon the base, the roller bridge including a plurality of roller support assemblies, wherein each roller support assembly comprises a saddle block with two opposing walls, wherein each wall contains a roller bore, and yet further wherein the roller bore on one opposing wall is disposed farther from the base than the roller bore on the other opposing wall, and a plurality of rollers, wherein each roller is contained within the saddle block and disposed so as to rotate around a corresponding roller axis, wherein the corresponding roller axis is defined by an axis through the roller bores on the opposing walls and further disposed so as to receive one of the tensioned strings, wherein, the tensioned string exerts both a static force component along the corresponding roller axis and a vibratory force component along the corresponding roller axis, further wherein the corresponding roller axis is disposed with relation to the support plane such that the static force component directed upon the corresponding roller axis is generally greater than the vibratory force component directed along the corresponding roller axis.

2. The apparatus of claim 1, wherein the corresponding roller axis defines a corresponding roller axis angle in respect to the support plane, wherein the corresponding roller axis angle is an oblique roller angle between about 3 degrees and about 30 degrees.

3. The apparatus of claim 2, wherein, the corresponding roller axis angle is about 6 degrees.

4. The apparatus of claim 1, wherein, at least one roller comprises a generally cylindrical body having a circumferential seat for receiving the corresponding tensioned string.

5. The apparatus of claim 1, wherein the opposing walls define a roller cavity; and further comprising an axle disposed in the roller bore such that the axle extends across the roller cavity, wherein, for each saddle block, the corresponding roller is disposed upon the axle.

6. The apparatus of claim 5, wherein for each saddle block, the axle rotates within the axle bores.

7. The apparatus of claim 5, wherein, at least one axle comprises a roller pin.

8. The apparatus of claim 5, wherein, each roller support assembly further includes:

an intonation adjustment structure disposed so as to displace the saddle block relative to the base support surface.

9. The apparatus of claim 8, wherein the intonation adjustment structure includes:

a saddle height support displaceably housed in the saddle block and extending from the saddle block so as to slidably engage the base support surface, wherein, with the saddle block disposed an offset distance from the base support surface, displacement of the saddle height support relative to the saddle block changes the offset distance between the saddle block and the base support surface.

10. The apparatus of claim 9, wherein, the saddle height support comprises a saddle height screw rotatably disposed in a threaded bore, the threaded bore disposed in the saddle block, the saddle height screw extending from the saddle block so as to slidably engage the base support surface.

11. The apparatus of claim 8, wherein the intonation adjustment structure includes a longitudinal support displaceably housed in the saddle block and extending generally longitudinally from the saddle block so as to engage a retaining structure disposed on the base, and wherein, displacement of the longitudinal support relative to the saddle block longitudinally displaces the saddle block along the base.

12. The apparatus of claim 11, wherein the retaining structure comprises a retaining channel, and wherein the longitudinal adjustment support comprises an intonation screw rotatably disposed in a threaded bore, the threaded bore disposed in the saddle block, the intonation screw extending longitudinally from the saddle block, the retaining channel receiving the intonation screw.

13. The apparatus of claim 12, wherein the retaining channel includes a retaining seat, and wherein the intonation screw includes a hemispherical ball pivotally received by the retaining seat.

* * * * *